US009092906B2

(12) United States Patent
Yu et al.

(10) Patent No.: US 9,092,906 B2
(45) Date of Patent: Jul. 28, 2015

(54) GRAPHIC PROCESSOR AND METHOD OF EARLY TESTING VISIBILITY OF PIXELS

(75) Inventors: Chang-Hyo Yu, Yongin-si (KR); Lee-Sup Kim, Yuseong-gu (KR); Hong-Yun Kim, Daejeon (KR)

(73) Assignees: SAMSUNG ELECTRONICS CO., LTD., Suwon-si, Gyeonggi-do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 205 days.

(21) Appl. No.: 13/277,665

(22) Filed: Oct. 20, 2011

(65) Prior Publication Data

US 2012/0212488 A1    Aug. 23, 2012

(30) Foreign Application Priority Data

Feb. 22, 2011    (KR) .................. 10-2011-0015316

(51) Int. Cl.
    *G06T 15/40*     (2011.01)
    *G06T 15/00*     (2011.01)
    *G09G 5/39*     (2006.01)

(52) U.S. Cl.
    CPC ............... *G06T 15/40* (2013.01); *G06T 15/00* (2013.01); *G06T 15/005* (2013.01); *G06T 15/405* (2013.01); *G09G 5/39* (2013.01); *G06T 2207/20144* (2013.01)

(58) Field of Classification Search
    CPC ....... G06T 15/40; G06T 15/405; G06T 15/06; G06T 15/005
    USPC ................................................ 345/421, 422
    See application file for complete search history.

(56) References Cited

U.S. PATENT DOCUMENTS

| | | | |
|---|---|---|---|
| 7,027,047 B2 | 4/2006 | Kim et al. | |
| 2002/0093356 A1* | 7/2002 | Williams et al. | 324/765 |
| 2006/0033743 A1* | 2/2006 | Morein | 345/501 |
| 2006/0209078 A1 | 9/2006 | Anderson et al. | |
| 2007/0273689 A1* | 11/2007 | Tsao | 345/422 |
| 2008/0068375 A1 | 3/2008 | Min et al. | |

OTHER PUBLICATIONS

Yu, Ch, Kim, D, Kim, LS, An Area Efficient Early Z-Test Method for 3-D Graphics Rendering Hardware, Aug. 2008, IEEE-INST Electrical Electronics Engineers Inc.; http://dspace.kaist.ac.kr/handle/10203/11423.*

Choi, M.-H, Han, T.-D, Kim, S.-D, An Effective Visibility Culling Method Based on Cache Block, Aug. 2006, Computers, IEEE Transactions , vol. 55, Issue:8, http://ieeexplore.ieee.org/xpls/abs_all.jsp?arnumber=1650199&tag=1.*

Kim, et al.; A Memory-Efficient United Early Z-Test; IEE Transactions on Visulization and Computer Graphics; 2010; pp. 1-8; IEEE; USA.

* cited by examiner

*Primary Examiner* — Mark Zimmerman
*Assistant Examiner* — Sarah Le
(74) *Attorney, Agent, or Firm* — Lee & Morse, P.C.

(57) ABSTRACT

A graphic processor includes a rasterizer configured to process vertex data to generate fragment data based on a maximum depth value, a minimum depth value, and a mask bit of each pixel included in one tile, each mask bit indicating whether each pixel is drawn or not, the vertex data including three dimensional information of the pixels, a pixel shader configured to process the fragment data to generate color data, and a raster operation unit configured to convert the color data to pixel data to be displayed.

18 Claims, 24 Drawing Sheets

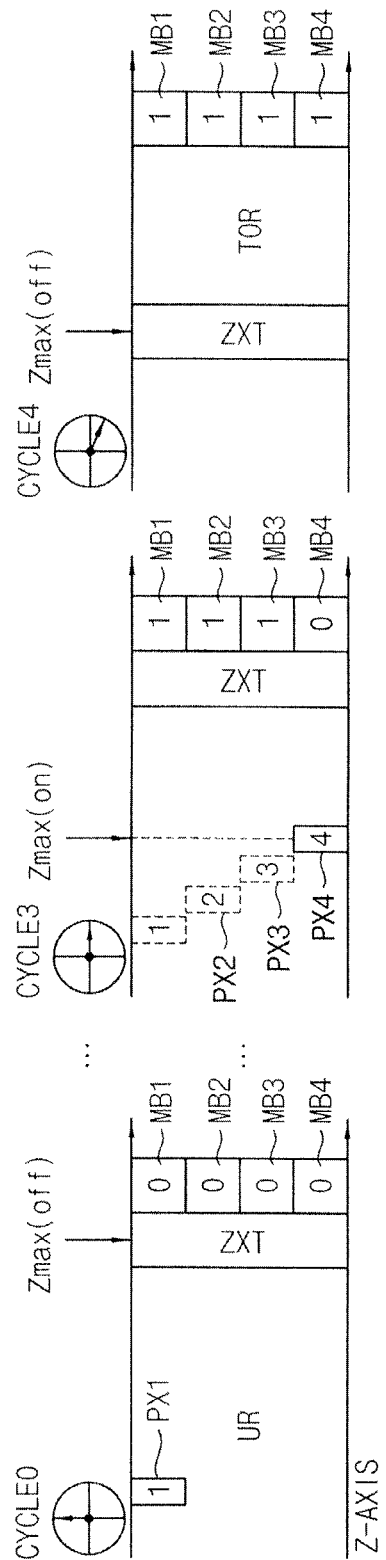

FIG. 16 input: ($x_{pixel}$, $y_{pixel}$, $z_{pixel}$, $z_{max}^{off-chip}$, $z_{min}^{off-chip}$, $maskbit^{off-chip}$)
procedure
1: initialize on-chip data;
  → $z_{max}^{on-chip} = z_{max}^{on-chip} = 1.0$, $maskbit^{on-chip} = N_{pixel}\{1'b0\}$
2: calculate depth of pixel $p_i$, $z_{pixel}$
3: compare $z_{pixel}$ with $z_{max}^{off-chip}$ and $z_{min}^{off-chip}$
  if ($z_{pixel} < z_{min}^{off-chip}$) then goto step 4.
  else if {($z_{pixel} > z_{max}^{off-chip}$) & ($maskbit_{x,y}^{off-chip} == '1'$)}
    then goto step 5.
  else then goto step 6.
4: $p_i$ is classified as trivially visible, goto step 7.
5: $p_i$ is classified as trivially occluded, goto step 7.
6: $p_i$ is classified as uncertain, goto step 7.
7: traverse the next pixel.
  if there are pixels to be traversed then goto step 2.
  else then update the data$^{off-chip}$ to the data$^{on-chip}$
  → $z_{min}^{off-chip} = z_{min}^{on-chip}$, $z_{max}^{off-chip} = z_{max}^{on-chip}$, $maskbit^{off-chip} = maskbit^{on-chip}$
8: move to the next tile and goto step 1.

GRAPHIC PROCESSOR AND METHOD OF EARLY TESTING VISIBILITY OF PIXELS

BACKGROUND

1. Technical Field

Example embodiments relate to three-dimensional (3-D) graphics, and more particularly to a graphic processor and a method of early testing visibility.

2. Description of the Related Art

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a vertex, polygon, or the like. Rendered images are formed with combinations of these graphic primitives. Many procedures may be utilized to perform 3-D graphics rendering.

SUMMARY

An embodiment is directed to a graphic processor, including a rasterizer configured to process vertex data to generate fragment data based on a maximum depth value, a minimum depth value, and a mask bit of each pixel included in one tile, each mask bit indicating whether each pixel is drawn or not, the vertex data including three dimensional information of the pixels, a pixel shader configured to process the fragment data to generate color data, and a raster operation unit configured to convert the color data to pixel data to be displayed.

Each of the pixels may be located in one of a first area, a second area, and a third area in a three dimensional space, based on the maximum depth value and the minimum depth value, the minimum depth value corresponding to a tile minimum value, the maximum depth value corresponding to a tile maximum value, a first boundary between the first area and the second area being determined by the tile minimum value, and a second boundary between the second area and the third area being determined by the tile maximum value, and, when a first object with respect to one tile is rasterized prior to a second object, the rasterizer may compare each depth value of pixels of the second object with a first tile maximum value and a first tile minimum value of the first object to determine whether each pixel of the second object is occluded or not, a pixel having a depth value greater than the first tile maximum value and which is drawn of a pixel of the second object being occluded.

The tile maximum value may be updated whenever each depth value of pixels in one tile is compared with the maximum tile value, and the tile minimum value may be updated after all depth values of pixels in the one tile are compared with the tile minimum value.

The rasterizer may include a traversal processing unit configured to perform traversal processing on the vertex data, a span processing unit configured to perform span processing on an output of the traversal processing unit, and a unified early depth test (UEZT) unit configured to perform a depth test on the pixels to determine visibility of each pixel based on each depth value of pixels in the one tile output from the span processing unit, and configured to determine a logic level of each mask bit based on whether each pixel is drawn or not.

The UEZT unit may include a tile maximum value generator configured to generate an on-chip tile maximum value of a current object based on each depth value of the pixels, the current object being currently rasterized, a tile minimum value generator configured to generate an on-chip tile minimum value of the current object based on each depth value of the pixels, and a mask bit generator configured to generate an on-chip mask bit of the current object based on an off-chip tile maximum value, an off-chip tile minimum value, and an off-chip mask bit of a previous object, the previous object being previously rasterized prior to the current object, the off-chip tile maximum value corresponding to a tile maximum value of the previous object, and the off-chip tile minimum value corresponding to a tile minimum value of the previous object.

The tile maximum value generator may includes a comparator configured to output a comparison signal based on a first depth value of a current pixel and a second depth value of a previous pixel, and a selection circuit configured to select the greater of the first depth value and the second depth value to provide the on-chip tile maximum value, in response to the comparison signal, and the tile minimum value generator may include a comparator configured to output a comparison signal based on a first depth value of a current pixel and a second depth value of a previous pixel, and a selection circuit configured to select the smaller of the first depth value and the second depth value to provide the on-chip tile minimum value, in response to the comparison signal.

The mask bit generator may include a comparison unit configured to generate first and second comparison signals by comparing a depth value of a current pixel with the off-chip tile maximum value and the off-chip tile minimum value, a decoder configured to decode an off-chip mask bit of the current pixel according to the first and second comparison signals, and a demultiplexer configured to demultiplex an output of the decoder in response to a selection signal to update a mask-bit of the current pixel as the on-chip mask bit, the selection signal designating the current pixel.

The mask bit generator may further include a sensing unit configured to provide a decision signal indicating a visibility of the current pixel based on the first and second comparison signals.

The graphic processor may further include a cache unit which includes an early depth cache memory configured to store the maximum depth value, the minimum depth value, and the mask bit.

Another embodiment is directed to a method of forming graphics data for an image to be displayed, the method including comparing a depth value of a pixel of a first object with respect to one tile with a tile minimum value and a tile maximum value, the first object being currently rasterized, and determining a visibility of the pixel based on a result of the comparison and a mask bit indicating whether the pixel is drawn or not.

The method may further include, when the first object is initially rasterized with respect to the one tile, setting the tile minimum value and the tile maximum value to predetermined values.

The method may further include, when a second object with respect to the one tile is rasterized prior to the first object, obtaining the tile minimum value and the tile maximum value from the second object.

The method may further include setting the tile maximum value at the greatest value of depth values of pixels with respect to the second object, and setting the tile minimum value at the smallest value of depth values of pixels with respect to the second object.

The method may further include determining that the pixel is a visible pixel when the depth value of the pixel is smaller than the minimum tile value.

The method may further include determining that the pixel is an occluded pixel when the depth value of the pixel is greater than the maximum tile value and the mask bit indicates that the pixel is drawn.

The method may further include determining that the pixel is an uncertain pixel when the depth value of the pixel is greater than the maximum tile value and the mask bit indicates that the pixel is not drawn.

The method may further include updating the tile maximum value whenever depth values of the pixels in the one tile are compared with the tile maximum value, and updating the tile minimum value after all depth values of pixels in the one tile are compared with the tile minimum value.

Another embodiment is directed to a method of generating pixel data of an image to be displayed on a display, the method including receiving input data and generating first and second fragments from said input data, the first fragment including first data representing at least two pixel coordinates and a depth value for each of a plurality of pixels forming the first fragment, and the second fragment including second data representing at least two pixel coordinates and a depth value for a pixel of the second fragment, the first and second fragments being stored in an on-chip cache memory, determining a tile maximum value representing a greatest depth value from among the depth values of the first data, determining a tile minimum value representing a least depth value from among the depth values of the first data, determining a relative spatial relationship of the pixel of the second fragment, the determination including comparing the depth value of the pixel of the second fragment to the tile maximum value and the tile minimum value, and, based on the comparison of the depth value of the pixel of the second fragment with the tile maximum value and the tile minimum value, determining whether a depth test is to be run on the second data, the depth test including reading data from an off-chip memory that is discrete from the cache memory.

The method may further include generating a modified tile depth value by modifying at least one of the tile maximum value and the tile minimum value based on the comparison of the depth value of the pixel of the second fragment with the tile maximum value and the tile minimum value, and, based on a comparison of the modified tile depth value with a depth value of a pixel of a third fragment that is to be rendered after rendering the pixel of the second fragment, determining whether the depth test is to be run on third data corresponding to the pixel of the third fragment.

Determining whether the depth test is to be run may include determining that the depth test is not to be run when the pixel depth value of the pixel of the second fragment is less than the tile minimum value, or when a mask bit corresponding to the pixel of the second fragment is in a first state and the pixel depth value of the pixel of the second fragment is greater than the tile maximum value, and determining that the depth test is to be run when the mask bit is in a second state and the pixel depth value of the pixel of the second fragment is greater than the tile maximum value, or when the pixel depth value of the pixel of the second fragment is greater than the tile minimum value but less than the tile maximum value.

BRIEF DESCRIPTION OF THE DRAWINGS

The above and other features and advantages will become more apparent to those of skill in the art by describing in detail example embodiments with reference to the attached drawings, in which:

FIGS. 9A and 9B illustrate updating a tile maximum value according to some example embodiments.

FIG. 15 illustrates a block diagram of an example of the UEZT cache memory in

FIG. 5 according to some example embodiments.

FIG. 16 illustrates an algorithm of operation performed in the UEZT unit according to some example embodiments.

DETAILED DESCRIPTION

Figure 1:
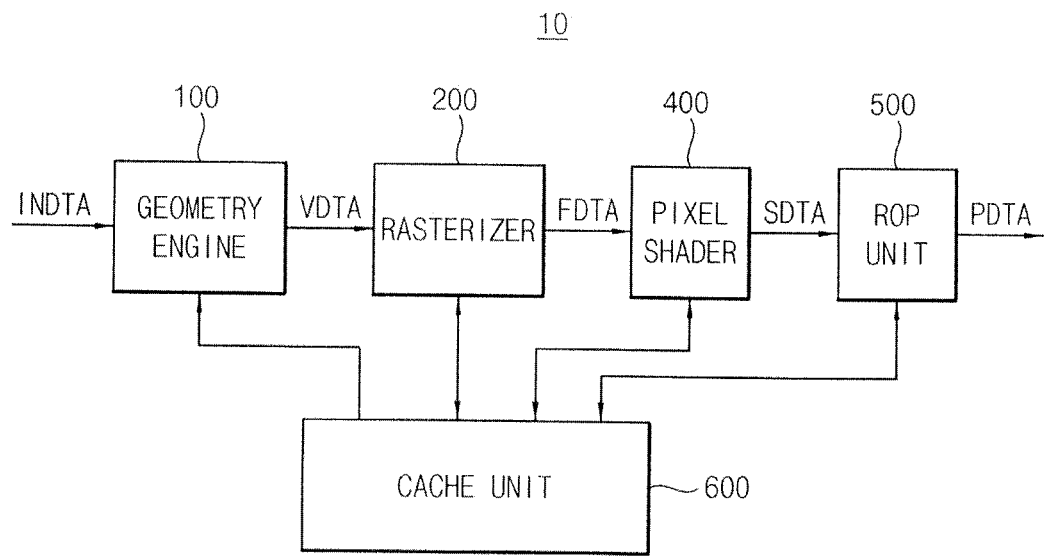
FIG. 1 illustrates a block diagram of an example of a graphic processor according to some example embodiments.

Korean Patent Application No. 10-2011-0015316, filed on Feb. 22, 2011, in the Korean Intellectual Property Office, and entitled: "Graphic Processor and Method of Early Testing Visibility of Pixels," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that, although the terms first, second, third, etc., may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an example of a graphic processor according to some example embodiments.

Referring to FIG. 1, a graphic processor (graphics pipeline, a graphic accelerator) 10 may include a geometry engine 100, a rasterizer 200, a pixel shader (or, fragment shader) 400, a raster operation ("ROP") unit 500, and a cache unit 600.

In the example shown in FIG. 1, the geometry engine 100 receives input data INDTA, and converts vector graphic information and background images in the input data INDTA to 3-D information which is capable of being processed in the graphic processor 10. For example, the geometry engine 100 may perform a geometry operation on the input data INDTA to generate vertex data VDTA including the 3-D information with respect to the input data INDTA. 3-D images may be represented with primitives, which are basic units of geometry. For 3-D graphics, primitives may include polygons (typically triangles), lines, points, etc. Each triangle is defined by three vertices, and each line is defined by two vertices. Each vertex may be associated with various attributes such as space coordinates, color values, texture coordinates, etc. Each attribute may have up to four components. For example, space coordinates may be given by either three components x, y, and z, or four components x, y, z, and w, where x and y are horizontal and vertical coordinates, z is depth, and w is a homogeneous coordinate. Color values may be given by three components r, g, and b, or four components r, g, b, and a, where r is red, g is green, b is blue, and a is a transparency factor that determines the transparency of a picture element (pixel). Texture coordinates are typically given by horizontal and vertical coordinates, u and v. A vertex may be associated with other attributes.

In the example shown in FIG. 1, the rasterizer 200 receives the vertex data VDTA from the geometry engine 100, and processes the vertex data VDTA to generate fragment data FDTA. The rasterizer 200 may process the vertex data VDTA on a tile basis to generate the fragment data FDTA. For example, the rasterizer 200 may process the vertex data VDTA including the 3-D information of pixels on a tile basis, based on a tile maximum value and a tile minimum value of the pixels (discussed further below) included in one tile, and a mask bit indicating whether each pixel is drawn or not, to selectively generate 2-D fragment data FDTA. The fragment data FDTA may include the pixel and information associated with the pixel. Thus, the fragment data FDTA may include color values generated through interpolation, pixel coordinates x and y, depth value z, texture coordinates u and v, and gradients of edges of a triangle.

In the example shown in FIG. 1, the pixel shader 400 receives the fragment data FDTA from the rasterizer 200, and performs shading processing on the fragment data FDTA on a pixel basis to generate color data SDTA. Thus, the pixel shader 400 determines color values of the fragment data FDTA. For determining the color values of the fragment data FDTA, the pixel shader may perform various graphics operations on pixels and fragments. The pixel shader 400 may calculate parameters for interpolating attributes of the pixels, for example, may calculate coefficients of linear equations for interpolating attributes. In addition, the pixel shader 400 may calculate attribute components of the pixels in a triangle by using interpolating parameters, based on screen coordinates of each pixel. In addition, the pixel shader 400 may use texture mapping for applying a texture to each triangle.

In the example shown in FIG. 1, the raster operation unit 500 receives the color data SDTA from the pixel shader 400, and converts the color data SDTA to pixel data PDTA to be displayed on a display. The pixel data PDTA may be provided to an external frame buffer as data to be displayed on a display (or a screen), and may be stored in the external frame buffer.

The cache unit 600 may include a plurality of cache memories (refer to FIG. 5), and may be respectively connected to the geometry engine 100, the rasterizer 200, the pixel shader 400, and the raster operation unit 500. The cache unit 600 may store corresponding data or prefetch data from an external memory (or frame buffer).

Figure 2:
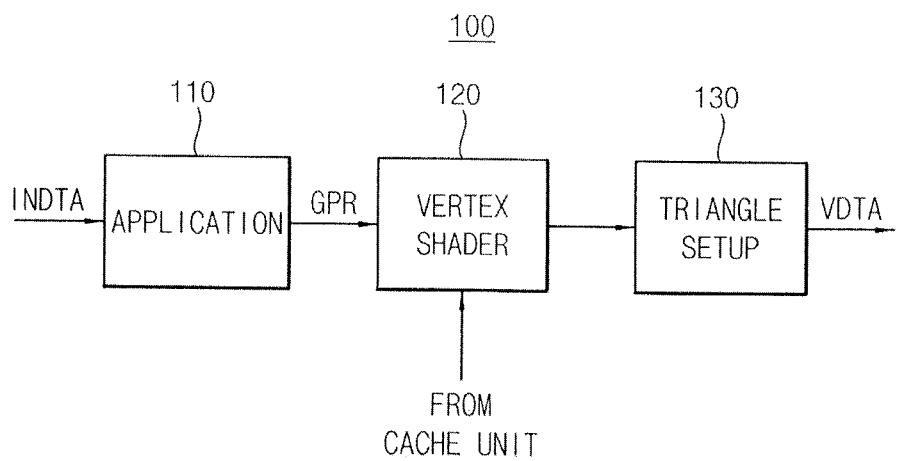
FIG. 2 illustrates a block diagram of an example of a geometry engine in FIG. 1 according to some example embodiments.

FIG. 2 illustrates a block diagram of an example of the geometry engine 100 in FIG. 1 according to some example embodiments.

Referring to FIG. 2, the geometry engine 100 may include an application 110, a vertex shader 120, and a triangle setting unit 130.

The application 110 may perform a physical operation on the input data INDTA to provide a geometric primitive GPR to the vertex shader 120. The vertex shader 120 may perform vertex processing on the geometric primitive GPR. For example, the vertex shader 120 may convert one coordinate of the geometric primitive GPR to another coordinate, may calculate color values of vertices of the geometric primitive GPR, and may perform blending on the geometric primitive GPR. The triangle setting unit 130 may provide the vertex data VDTA, which is 3-D information on pixels (or tiles, discussed below) including at least portions of a triangle, based on output of the vertex shader 120.

For providing the vertex data VDTA that is 3-D information on pixels (or tiles) including at least portions of a triangle, the triangle setting unit 130 may perform tile binning for determining tiles which include at least portion of a triangle.

Further to the above, when each of the triangles that have to be processed in the rasterization process is processed with respect to an entire scene, a frame buffer having the same size as a scene resolution is used. In this case, since it may be difficult to embed the frame buffer in a chip (due to the size of the frame buffer), access may be performed via external memory (e.g., external RAM), although the external memory access may consume many times the amount of power of an on-chip memory access. However, when the tile binning is performed, rendering with respect to one tile is performed by using a frame memory having a size of one tile resolution embedded in a chip. When the rendering with respect to one tile is completed, it may be transmitted to a tile position of an external frame buffer. It is very advantageous, from a low power driving perspective and a short latency perspective, for tile-based rasterization including tile binning, since there is not frequent external frame buffer memory access.

Figure 3:
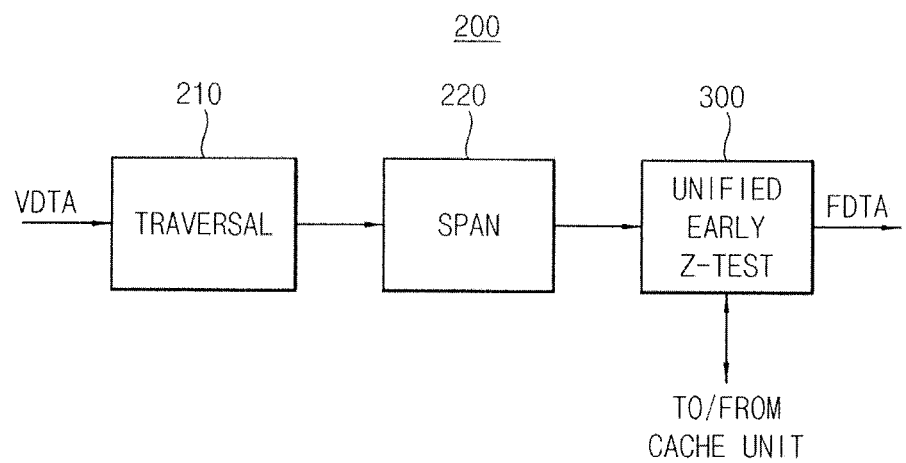
FIG. 3 illustrates a block diagram of an example of a rasterizer in FIG. 1 according to some example embodiments.

FIG. 3 illustrates a block diagram of an example of the rasterizer 200 in FIG. 1 according to some example embodiments.

In the example shown in FIG. 3, the rasterizer 200 includes a traversal processing unit 210, a span processing unit 220, and a unified early depth (z-value) test (UEZT) unit 300.

In the example shown in FIG. 3, the traversal processing unit 210 performs a traversal processing on the vertex data VDTA, the span processing unit 220 performs a span processing on an output of the traversal processing unit 210, and the UEZT unit 300 performs a depth test (z-value test) on an output of the span processing unit 220. The UEZT unit 300 may perform a depth test on the pixels in one tile, output from the span processing unit 200, to determine visibility of each pixel based on each depth value of the pixels, and to determine a logic level of each mask bit. Operation of the UEZT unit 300 will be described below with reference to FIGS. 11 through 14.

Figure 4:
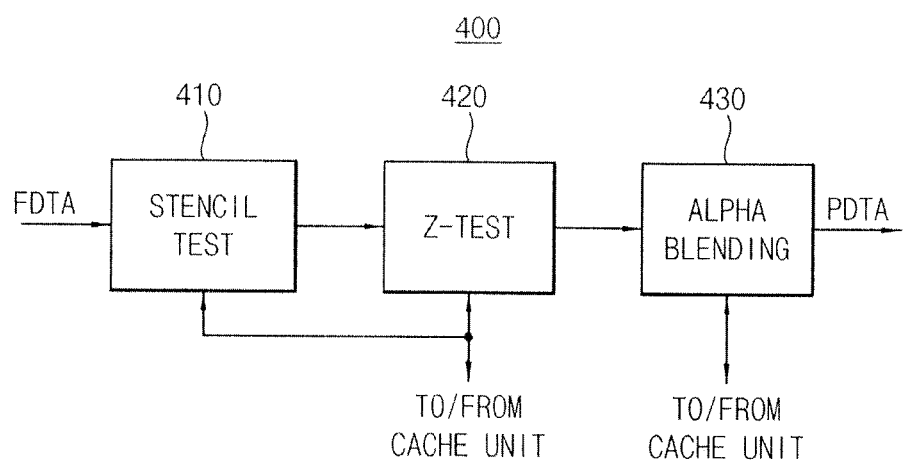
FIG. 4 illustrates a block diagram of an example of a raster operation unit in FIG. 1 according to some example embodiments.

FIG. 4 illustrates a block diagram of an example of the pixel shader 400 in FIG. 1 according to some example embodiments.

In the example shown in FIG. 4, the pixel shader 400 includes a stencil test unit 410, a depth (Z) test unit 420, and an alpha blending unit 430.

The stencil test unit 410 may pass or occlude each of the pixels by comparing each stencil value stored in each of the pixels in the fragment data FDTA with a reference value.

The depth (Z) test unit 420 may pass or occlude each of the pixels that pass the stencil test unit 410 by comparing each depth value of the pixels which pass the stencil test unit 410 with a corresponding depth value stored in a depth buffer 620 (see FIG. 5) in the cache unit 600. For example, the depth test unit 420 may pass a current pixel that passes the stencil test unit 410 when a depth value of the current pixel is smaller than a corresponding depth value stored in the depth buffer 620. The depth test unit 420 may occlude the current pixel that passes the stencil test unit 410 when the depth value of the current pixel is greater than a corresponding depth value stored in the depth buffer 620.

The alpha blending unit 430 may determine transparency of each of the pixels that pass the stencil test unit 410 and the depth test unit 420.

In FIG. 4, although the stencil test unit 410 and the depth test unit 420 are separately illustrated, the stencil test unit 410 and the depth test unit 420 may be incorporated into one test unit which is capable of performing stencil test and depth test in some embodiments. In addition, the stencil test unit 410 and the depth test unit 420 may share the depth cache memory 620. In addition, the alpha blending unit 430 may perform graphics operations such as alpha test, fog blending, logic operation, and dithering operating on each of the pixels that pass the stencil test unit 410 and the depth test unit 420 in addition to the alpha blending operation.

Figure 5:
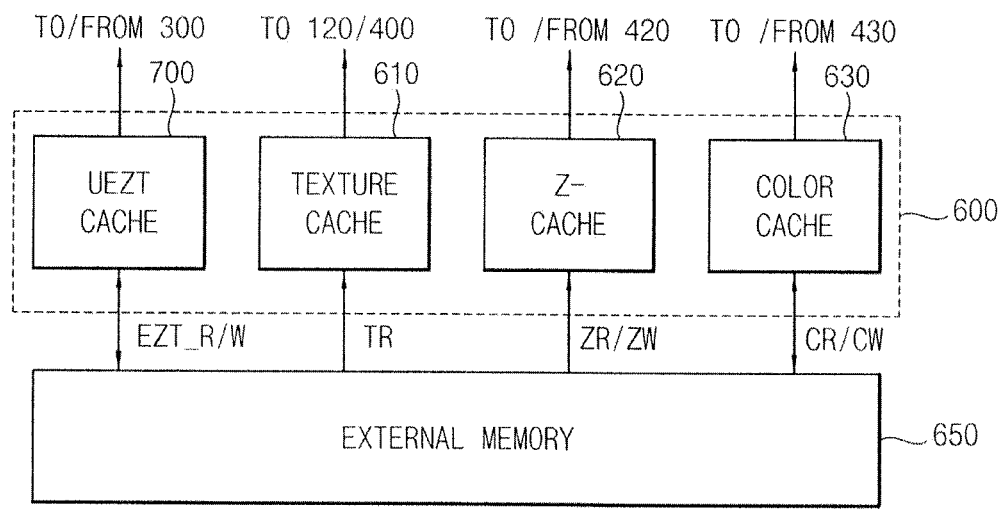
FIG. 5 illustrates a block diagram of an example of a cache unit in FIG. 1 according to some example embodiments.

FIG. 5 illustrates a block diagram of an example of the cache unit 600 in FIG. 1 according to some example embodiments.

In the example shown in FIG. 5, the cache unit 600 includes a UEZT cache memory 700, a texture cache memory 610, the depth cache (Z-cache) memory 620, and a color cache memory 630. In FIG. 5, an external memory is also illustrated for convenience of explanation.

The UEZT cache memory 700 may be connected to the UEZT unit 300 in FIG. 3. The UEZT cache memory 700 may prefetch tile data (the tile data meaning the tile maximum value, the tile minimum value, and the mask bit with respect to one tile) from the external memory 650 or update the tile data to the external memory 650 (see EZT_R/W in FIG. 5). The texture cache memory 610 may be connected to the vertex shader 120 in FIG. 2 and the pixel shader 400 in FIG. 1. The texture cache memory 610 may prefetch texture data from the external memory 650 (see TR in FIG. 5). The depth cache memory 620 may be connected to the stencil test unit 410 and/or the depth test unit 420 in FIG. 4. The depth cache memory 620 may prefetch stencil values/depth values from the external memory 650 or update the stencil values/the depth values to the external memory 650 (see ZR/ZW in FIG. 5). The color cache memory 630 may be connected to the alpha blending unit 430 in FIG. 4. The color cache memory 630 may prefetch color values (alpha values) from the external memory 650 or update the color values (alpha values) to the external memory 650 (see CR/CW in FIG. 5).

Figure 6:
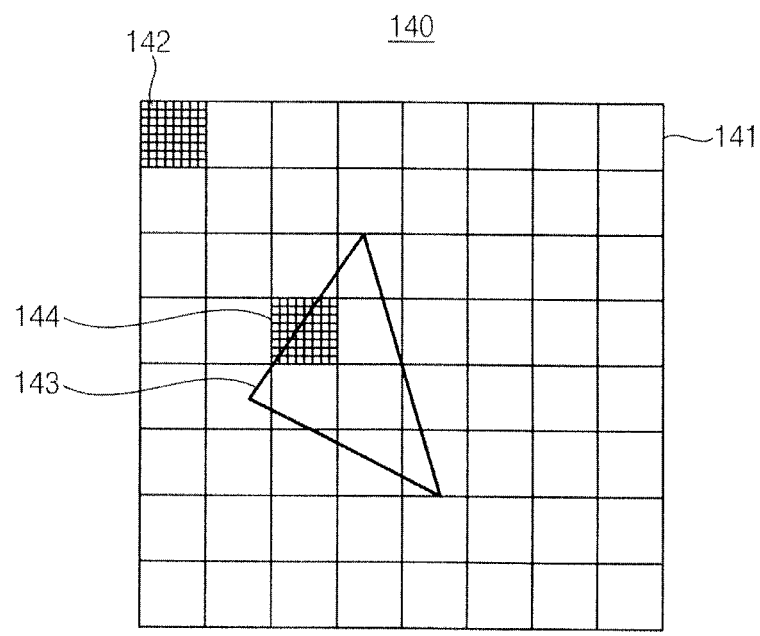
FIG. 6 illustrates a display (or, screen) partitioned into a plurality of tiles.

FIG. 6 illustrates a display (or, screen) 140 partitioned into a plurality of tiles.

In the example shown in FIG. 6, the display 140 includes 8×8 tiles 141. However, the display may, according to other embodiments, be partitioned into any number of tiles 141, even a single tile. Each tile 141 is partitioned into a plurality of pixels 142. In this example embodiment, each tile 141 includes 8×8 pixels. Other dimensions may be, e.g., 4×4, 8×4, 16×4, 16×8, or 16×16, or any number of pixels.

The tile minimum value of the tile 141 represents a minimum depth value of all the depth values of pixels within the tile 141. Correspondingly, the tile maximum value represents a maximum depth value of all the depth values of pixels within the tile 141.

Three vertices of a triangle are located in 3-D space including x, y, and z axes (the z-axis corresponds to a direction of a viewer). Therefore, depth value (z-value) along the z-axis represents a distance from the viewer. Thus, the greater the depth value is, the farther the distance is from the viewer. Accordingly, when multiple pixels have same x value and y value, the viewer sees a pixel having the smallest depth value (z-value).

In FIG. 6, a portion of a new triangle 143 is to be rendered in a tile 144. Before the color and depth buffers are updated according to the potential influence of triangle 143, a determination is made as to whether the triangle 143 will be obscured by primitives already rendered into the tile 144.

Figure 7A:
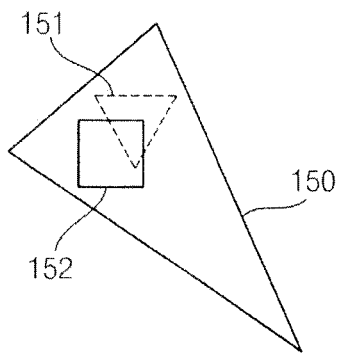
FIGS. 7A to 7C illustrate various situations that could happen when an object, such as a triangle, is rendered into a tile.
Figure 7B:
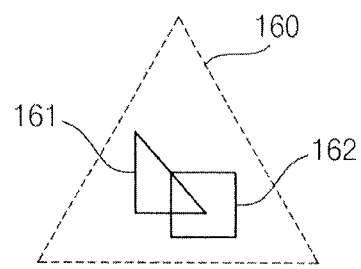
Figure 7C:
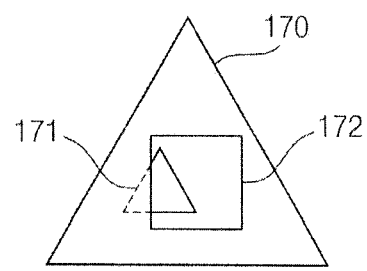

FIGS. 7A to 7C illustrate various situations that could happen when an object, such as a triangle, is rendered into a tile.

In FIGS. 7A to 7C, that part of a triangle that is located farther away than at least a portion of another triangle is drawn with a dashed line.

Referring to FIG. 7A, a first triangle 150 is displayed in a tile 152. A second triangle 151 is then rendered in the tile 152. The tile minimum value for the tile 152 is the same as the minimum polygon depth value for the first triangle 150 in the tile 152, and the tile maximum value for the tile 152 is the same as the maximum polygon depth value for the first triangle 150 in the tile 152. Assume the second triangle 151 is entirely located further away than the first triangle 150. Consequently, the minimum polygon depth value of the second triangle 151 is larger than the maximum polygon depth value of the first triangle 150 and consequently larger than the tile maximum value of the tile 152. The first triangle 150 is the object that is located closest to a viewer in the tile 152. By comparing the minimum polygon depth value of the second triangle 151 with the tile maximum value of the tile 152, it may be ascertained that the second triangle 151 should not overwrite any buffer values (e.g., z and color) for the tile 152.

Referring to FIG. 7B, a first triangle 160 is displayed in a tile 162. A second triangle 161 is then rendered in the tile 162. The tile minimum value for the tile 162 is the same as the minimum polygon depth value for the first triangle 160, and the tile maximum value for the tile 162 is the same as the maximum polygon depth value for the first triangle 160 in the tile 162. The second triangle 162 is located closer to the viewer than the first triangle 160. Consequently, the maximum polygon depth value of the second triangle 161 is smaller than the minimum polygon depth value of the first triangle 160 and than the tile minimum value for the tile 162. Thus, by comparing the maximum polygon depth value of the second triangle 162 with the tile minimum value of the tile 162, it may be ascertained that the second triangle should be rendered, and memory reads to the depth buffer can be completely avoided for the tile 162, but the z-values of the polygon can be directly written to the depth buffer.

Referring to FIG. 7C, a first triangle 170 is displayed in a tile 172. The tile minimum value for the tile 172 is the same as the minimum polygon depth value of the first triangle of the first triangle 172, and the tile maximum value of the tile 172 is the same as the maximum polygon depth value of the first triangle 170. A second triangle 171 is rendered in the tile 172. The second triangle 171 is only partly located further away than the first triangle 170 in a way so that at least a portion of the second triangle 171 (marked with a solid line) is closer than the first triangle 170, and at least one other portion of the second triangle 171 (marked with a dashed line) is farther away than the first triangle 170. Consequently, the minimum polygon depth value of the second triangle 171 is smaller than the tile maximum value of the tile 172, and/or the maximum polygon depth value of the second triangle 171 is larger than the tile maximum value of the tile 172. Thus, only by comparing the minimum polygon depth value and the maximum polygon depth value of the second triangle 171 with the tile minimum value and/or the tile maximum value of the tile 172, it may not be ascertained whether the second triangle 171 should be rendered or not be rendered, and further processing is required, wherein the depth buffer will be read.

It should be noted that the situations described in FIGS. 7A to 7C are only given for explanation purpose. Other situations may also occur, for example when the triangles are not overlapping. In addition, other numbers of triangles within a display region are possible. Furthermore, each pixel of a tile may relate to a different triangle.

Figure 8:
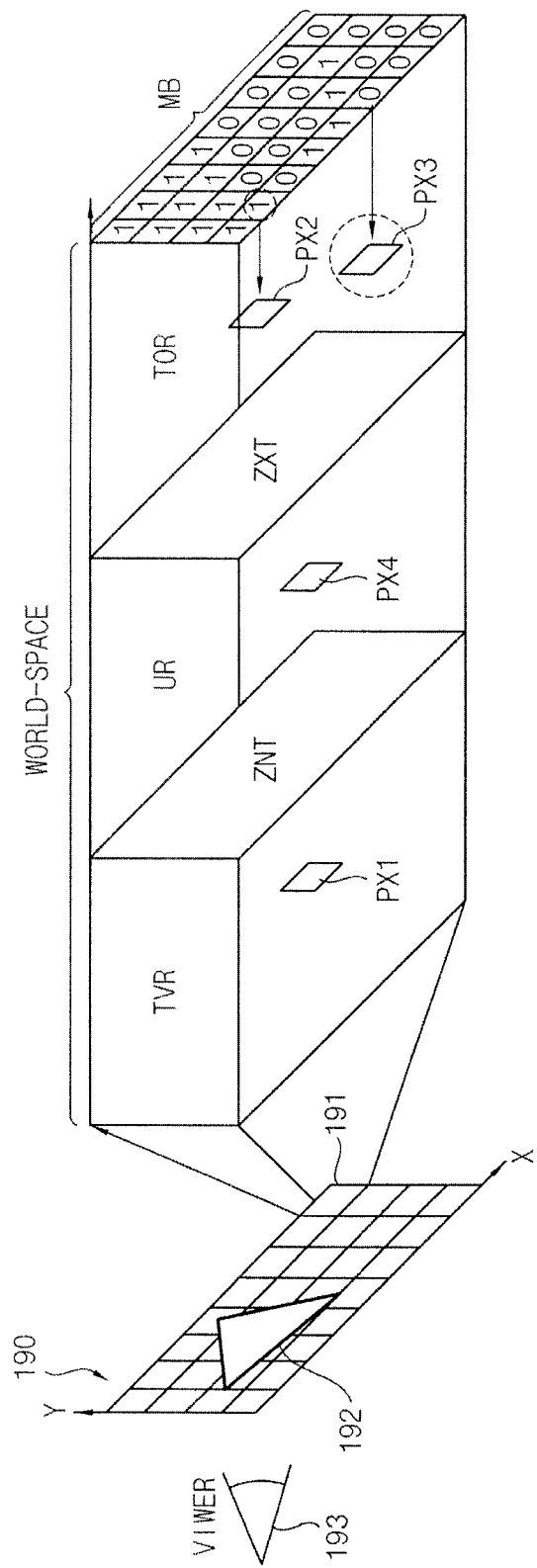
FIG. 8 illustrates schematically an operation performed in the UEZT unit in FIG. 3 according to some example embodiments.

FIG. 8 illustrates schematically an operation performed in the UEZT unit in FIG. 3 according to some example embodiments.

Referring to FIG. 8, a triangle 192 and a plurality of tiles 191 are illustrated. The triangle 192 is displayed in a 2-dimensional (2-D) screen 190 and the 2-D screen includes the tiles 191. Each of the tiles 191 may include a plurality of pixels as illustrated in 6.

A 3-D space or world space in the tile 191 may be divided into a visible region TVR, an uncertain region UR, and an occluded region TOR by a tile minimum value ZNT and a tile maximum value ZXT.

The tile minimum value ZNT and the tile maximum value ZXT may respectively have predetermined values when the triangle 192 is an object that is initially drawn. In addition, the tile minimum value ZNT and the tile maximum value ZXT may values which are updated by an object which is already drawn, when the triangle 192 is an object that is not initially drawn.

In the example shown in FIG. 8, a depth value (z-value) of a first pixel PX1 that is rendered (rasterized) in the tile 191 is smaller than the tile minimum value ZNT. Therefore, the first pixel PX1 is located in the visible region TVR, and thus the first pixel PX1 is determined as a visible pixel. Since the first pixel PX1 is determined as the visible pixel, and is thus known to be visible to a viewer 193, there is no need for accessing the external memory 650 when the depth test is performed in the raster operation unit 500.

In the example shown in FIG. 8, a depth value (z-value) of a second pixel PX2 that is rendered (rasterized) in the tile 191 is greater than the tile maximum value ZXT, such that the second pixel PX2 is located in the occluded region TOR, and has a mask bit (MB in FIG. 8) of high level ('1' in FIG. 8), and thus the second pixel PX2 is determined as an occluded pixel. Since the second pixel PX2 determined as the occluded pixel is known to be invisible to the viewer 193, the rasterizer 200 may reject the second pixel PX2 and may not provide the second pixel PX2 to the pixel shader 400. Therefore, the pixel shader 400 and the raster operation unit 500 may avoid accessing the external memory 650 with respect to the second pixel PX2.

In the example shown in FIG. 8, a depth value (z-value) of a third pixel PX3 that is rendered (rasterized) in the tile 191 is greater than the tile maximum value ZXT, such that the third pixel PX3 is located in the occluded region TOR, and has a mask bit MB of low level ('0' in FIG. 8), and thus the third pixel PX3 is determined as an uncertain pixel. Since it is uncertain whether the third pixel PX3 is visible to the viewer 193, the visibility of the third pixel PX3 is determined in the pixel shader 400 and the raster operation unit 500.

In the example shown in FIG. 8, a depth value (z-value) of a fourth pixel PX4 that is rendered (rasterized) in the tile 191 is greater than the tile minimum value ZNT but less than the tile maximum value ZXT. Therefore, the third pixel PX4 is located in the uncertain region UR, and thus the fourth pixel PX4 is determined as an uncertain pixel. Since whether the fourth pixel PX4 is visible to the viewer 193 is uncertain, the visibility of the fourth pixel PX4 is determined in the pixel shader 400 and the raster operation unit 500. Thus, the external memory 650 may be accessed with respect to the third and fourth pixels PX3 and PX4.

Further to the above, narrowing the uncertain region UR in the 3-D space as far as possible helps to reduce accessing the external memory 650. In some example embodiments, while the UEZT unit 300 determines the visibility of each pixel in one tile based on each depth value of the pixels and the mask bit indicating whether the pixel is drawn or not, the UEZT unit 300 updates the tile minimum value ZNT and the tile maximum value ZXT whenever the pixel information is generated. The tile maximum value ZXT may be updated whenever each pixel is drawn, thus, whenever each depth value of the pixels in one tile is compared with the maximum tile value ZXT. The tile minimum value ZNT may be updated after all the pixels in one tile are drawn, thus, after all the depth values of the pixels in one tile are compared with the tile minimum value ZNT. Through such mechanism, the uncertain region UR may be narrowed by enlarging the occluded region TOR as far as possible. By contrast, in comparative schemes, the tile minimum value ZNT and the tile maximum value ZXT have fixed values while one frame is being rendered, and, thus, the uncertain region UR has a fixed range while one frame is being rendered.

Figure 9B:
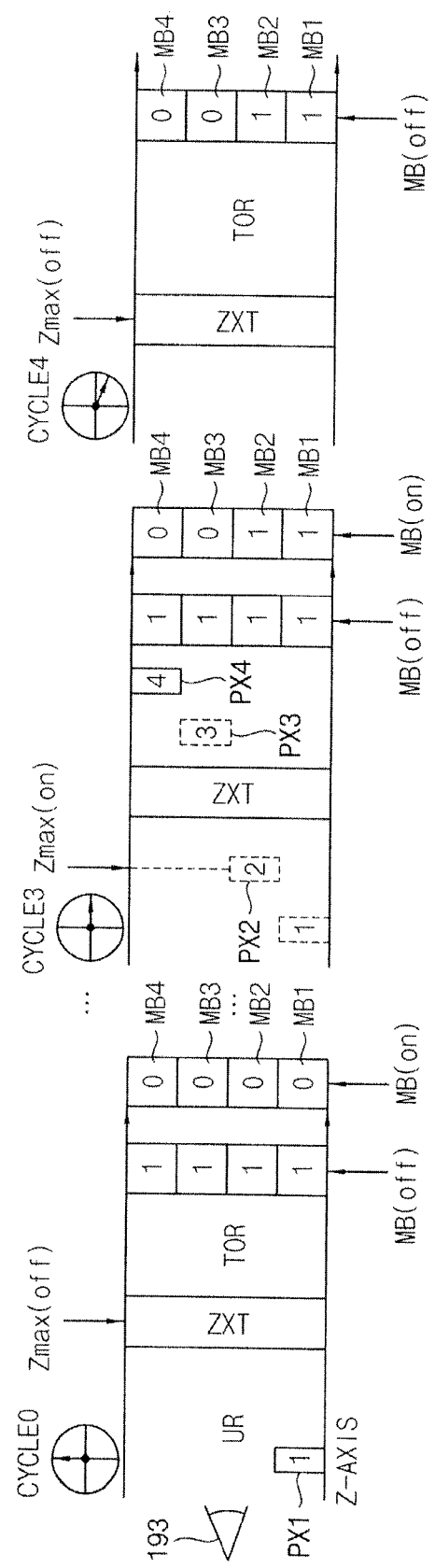

FIGS. 9A and 9B illustrate updating a tile maximum value according to some example embodiments.

In FIGS. 9A and 9B, it is assumed that one tile (for example, the tile 191 in FIG. 8) includes the pixels PX1~PX4.

FIG. 9A illustrates a case when a first object is initially drawn in the tile (for example, the tile 191 in FIG. 8).

In the example shown in FIG. 9A, the tile maximum value ZXT is set as the largest value because there is no object drawn in the tile at an initial cycle CYCLE0. Each mask bit of the pixels PX1~PX4 is set as logic low level, because the pixels PX1~PX4 are not drawn yet. During a third cycle CYCLE3, each mask bit MB1~MB3 of the pixels PX1~PX3 has a logic high level, because the pixels PX1~PX3 are drawn until the third cycle CYCLE3. During a fourth cycle CYCLE4, each mask bit MB1~MB4 of the pixels PX1~PX4 has a logic high level, because all of the pixels PX1~PX4 in one tile are drawn until the fourth cycle CYCLE4. In addition, while the pixels PX1~PX4 are sequentially drawn, the tile maximum value ZXT is continuously updated as an on-chip tile maximum value Zmax(on). When drawing the pixel PX4 is completed, the on-chip tile maximum value Zmax(on) has the same value as an off-chip Zmax(off). In addition, when drawing the pixel PX4 is completed, the mask bits MB1~MB4 of the pixels PX1~PX4 are updated as off-chip mask bit MB(off).

FIG. 9B illustrates a case when a second object is drawn in the tile (for example, the tile 191 in FIG. 8).

In the example shown in FIG. 9B, at an initial cycle (CYCLE0) before the first pixel PX1 is drawn, the tile maximum value ZXT with respect to the first object is the off-chip tile maximum value Zmax(off); off-chip mask bits MB(off) with respect to the first object are also illustrated. Since the pixels PX1~PX4 are not drawn yet, each mask bit MB1~MB4 of the pixels PX1~PX4 is initialized as logic low level (a first logic level) (on-chip mask bits MB(on)). The first pixel PX1 and the second pixel PX2 are drawn and the on-chip mask bits MB1 and MB2 of the pixels PX1 and PX2 have logic high level (second logic level) at a third cycle CYCLE3, because each depth value of the pixels PX1 and PX2 is smaller than the tile maximum value ZXT with respect to the first object. At this time, a third pixel PX3 is not drawn and the on-chip mask bit MB3 of the third pixel PX3 has a logic low level because the depth value of the third pixel PX3 is greater than the tile maximum value ZXT with respect to the first object. In a fourth cycle CYCLE4, a fourth pixel PX4 is not drawn and the on-chip mask bit MB4 of the third pixel PX4 has a logic low level because the depth value of the fourth pixel PX4 is greater than the tile maximum value ZXT with respect to the first object. Therefore, the on-chip mask bits MB1, MB2, MB3 and MB4 respectively having values of '0', '0', '1', and '1' are updated as the off-chip mask bits MB(off). The on-chip tile maximum value Zmax(on) is sequentially updated as the depth values of the pixels PX1 and PX2 until the third cycle CYCLE3, and the off-chip tile maximum value Zmax(off) has the same as the depth value of the second pixel PX2 at the fourth cycle CYCLE4.

Referring to FIGS. 9A and 9B, it is noted that the off-chip tile maximum value Zmax(off) has the depth value of the fourth pixel PX4 with respect to the first object in FIG. 9A, and the off-chip tile maximum value Zmax(off) has the depth value of the second pixel PX2 with respect to the second object in FIG. 9B. Thus, the uncertain region UR is gradually narrowed by decreasing the off-chip tile maximum value Zmax(off) with respect to one tile. The third and fourth pixels PX3 and PX4 with respect to the second object are determined to be located in the occluded region TOR by the off-chip tile maximum value Zmax(off) with respect to the first object, and the third and fourth pixels PX3 and PX4 may be rejected. In addition, when processing the fourth pixel PX4 is completed, thus, after the on-chip tile maximum value Zmax(on) is updated as the off-chip tile maximum value Zmax(off), the off-chip mask bits MB3 and MB4 are also updated to '0' and '0', and thus the off-chip tile maximum value Zmax(off) of the corresponding tile is again initialized until a corresponding mask bit MB is updated to '1'.

Figure 10A:
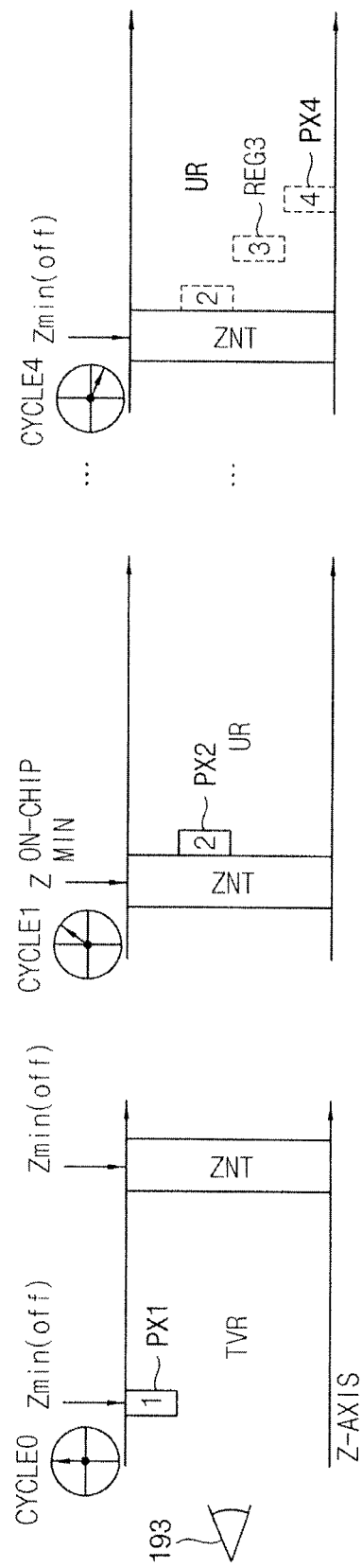
FIG. 10A illustrates updating a tile minimum value according to a comparative scheme.

FIG. 10A illustrates updating a tile minimum value according to a comparative scheme.

Figure 10B:
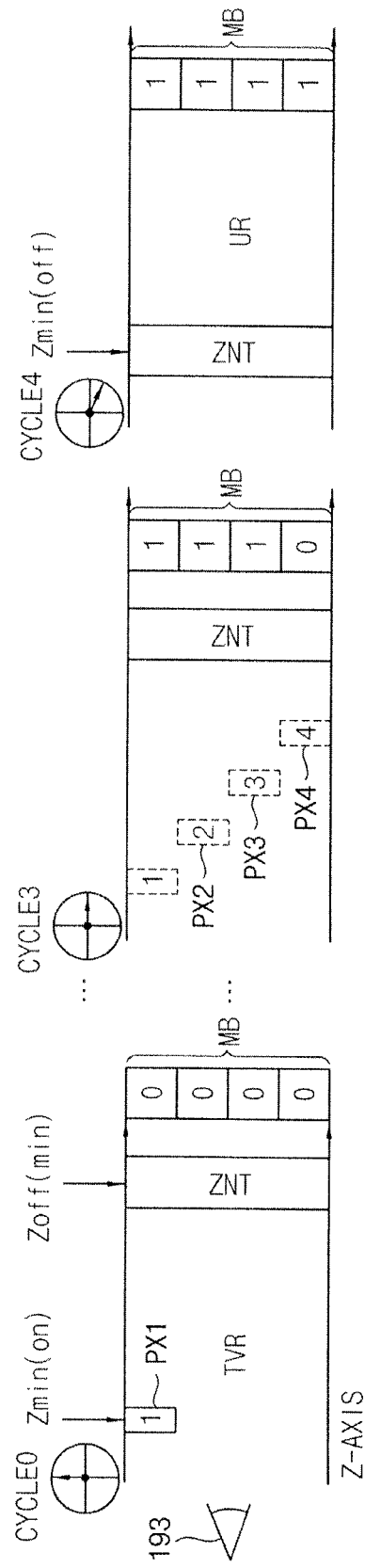
FIG. 10B illustrates updating a tile minimum value according to some example embodiments.

FIG. 10B illustrates updating a tile minimum value according to some example embodiments.

In FIGS. 10A and 10B, it is assumed that one tile (for example, the tile 191 in FIG. 8) includes the pixels PX1~PX4.

In the comparative scheme shown in FIG. 10A, at an initial cycle (CYCLE0) before the first pixel PX1 is drawn, the off-chip tile maximum value Zmax(off) is set as the largest value. When the first pixel PX1 is drawn in the first cycle CYCLE1, the on-chip tile maximum value Zmax(on) is updated as the depth value of the first pixel PX1. Until a fourth cycle CYCLE4, the second, the third, and the fourth pixels PX2, PX3, and PX4 are sequentially drawn. Each depth value of the second, the third, and the fourth pixels PX2, PX3, and PX4 is greater than the depth value of the first pixel PX1, and, thus, the second, the third, and the fourth pixels PX2, PX3, and PX4 are located in the uncertain region UR. In addition, the depth value of the first pixel PX1 is updated as the off-chip tile minimum value Zmin(off).

By contrast, in the example shown in FIG. 10B, according to some example embodiments, at an initial cycle (CYCLE0) before the first pixel PX1 is drawn, the off-chip tile maximum value Zmax(off) is set as the largest value, and each mask bit MB of the pixels PX1~PX4 is initialized as '0' (logic low level). In the third cycle CYCLE3, each mask bit MB1~MB3 of the pixels PX1~PX3 has a logic high level, because the pixels PX1~PX3 are drawn until the third cycle CYCLE3, and the mask bit MB4 of the fourth pixel PX4 is still '0' because the fourth pixel PX4 is not drawn. In a fourth cycle CYCLE4, while the mask bit MB4 of the fourth pixel PX4 is set to '1' (logic high level), because the fourth pixel PX4 is drawn, the off-chip tile minimum value Zmin(off) is updated as the depth value of the first pixel PX1. Thus, the off-chip tile minimum value Zmin(off) is updated as the depth value of the pixel located nearest to a viewer, and, thus, the visible region TVR may be widened as far as possible according to some example embodiments. Since the all of the pixels PX1~PX4 are located in the visible region TVR, memory access to a depth buffer may be skipped by avoiding depth test of the pixels PX1~PX4.

The updating operation on the tile maximum value and the tile minimum value may be simultaneously performed, although the operation on the tile maximum value and the tile minimum value are separately described with reference to FIGS. 9A through 10B. In addition, a mask bit with respect to the tile maximum value may be reused as a mask bit with respect to the tile minimum value, because a pixel is located in one of the visible region TVR, the uncertain region UR, and the occluded region TOR. For example, mask bits of pixels with respect to a first object, which are used for updating the tile maximum value, may be used for updating the tile minimum value with respect to a second object.

Figure 11:
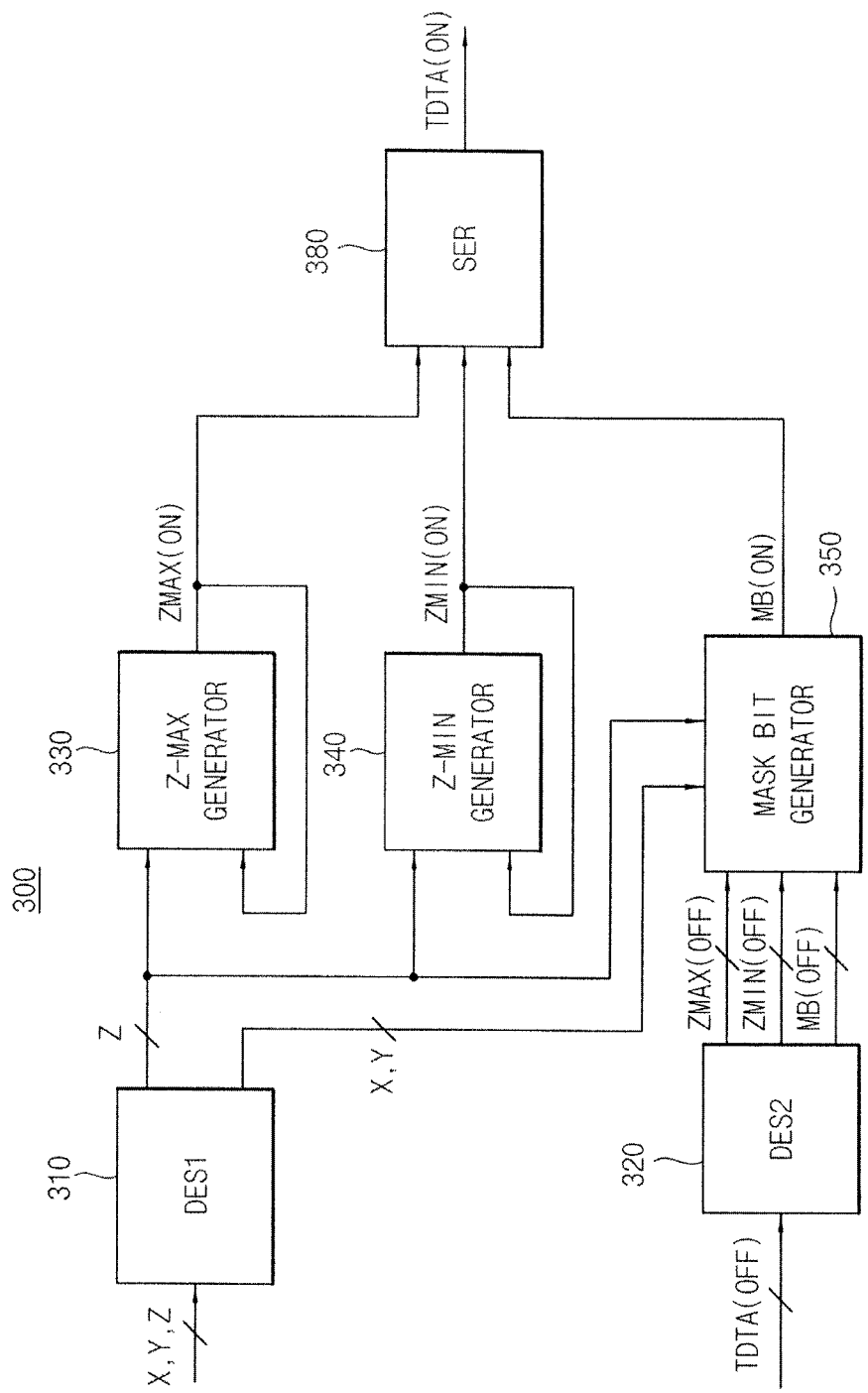
FIG. 11 illustrates a block diagram of an example of a UEZT unit in FIG. 3 according to some example embodiments.

FIG. 11 illustrates a block diagram of an example of the UEZT unit 300 in FIG. 3 according to some example embodiments.

In the example shown in FIG. 11, the UEZT unit 300 includes a first deserializer 310, a second deserializer 320, a tile maximum value generator 330, a tile minimum value generator 340, a mask bit generator 350, and a serializer 380.

The first deserializer 310 may divide 3-D coordinate values x, y, and z of a current pixel to be rasterized (or to be processed) into 2-D coordinate values x and y (indicating location of the current pixel) and z-value (indicating a depth value of the current pixel). Each of the 3-D coordinate values x, y, and z may be represented as a plurality of bits of floating point value, for example, 32-bit floating point values.

The second deserializer 320 may receive off-chip tile data TDAT(off), including an off-chip tile maximum value Zmax (off) of a previous object that is already rasterized, an off-chip tile minimum value Zmin(off) of the previous object, and off-chip mask bits MB(off) of the pixels in a tile of the previous object as data set, and may divide the off-chip tile data TDAT(off) into the off-chip tile maximum value Zmax (off), off-chip tile minimum value Zmin(off), and the off-chip mask bits MB(off). Each of the off-chip tile maximum value Zmax(off) and the off-chip tile minimum value Zmin(off) may be represented as a plurality of bits of floating point values, and the off-chip mask bits MB(off) may include a plurality of bits.

The tile maximum value generator 330 may generate an on-chip tile maximum value Zmax(on) based on depth values of pixels in a current tile that is currently rasterized. The tile maximum value generator 300 may generate the on-chip tile maximum value Zmax(on) by receiving sequentially depth values of the pixels in one tile, and comparing depth values of the previous pixel and the current pixel.

The tile minimum value generator 340 may generate an on-chip tile minimum value Zmin(on) based on the depth values of the pixels in the current tile. The tile minimum value generator 340 may generate the on-chip tile minimum value Zmin(on) by receiving sequentially the depth values of the pixels in one tile, and comparing the depth values of the previous pixel and the current pixel.

The mask bit generator 350 may generate on-chip mask bit MB(on) of a current object which is currently rasterized based on the off-chip tile maximum value Zmax(off) of the previous object, the off-chip tile minimum value Zmin(off) of the previous object, and off-chip mask bits MB(off) of the previous object. The mask bit generator 350 may receive the off-chip tile maximum value Zmax(off), the off-chip tile minimum value Zmin(off), the off-chip mask bits MB(off), the 2-D coordinate values x and y of the current pixel, and the z-value of the current pixel to generate the on-chip mask bit MB(on).

The serializer 380 may receive and serialize the on-chip tile maximum value Zmax(on), the on-chip tile minimum value Zmin(on), and the on-chip mask bit MB(on) to provide an on-chip tile data TDTA(on).

Figure 12:
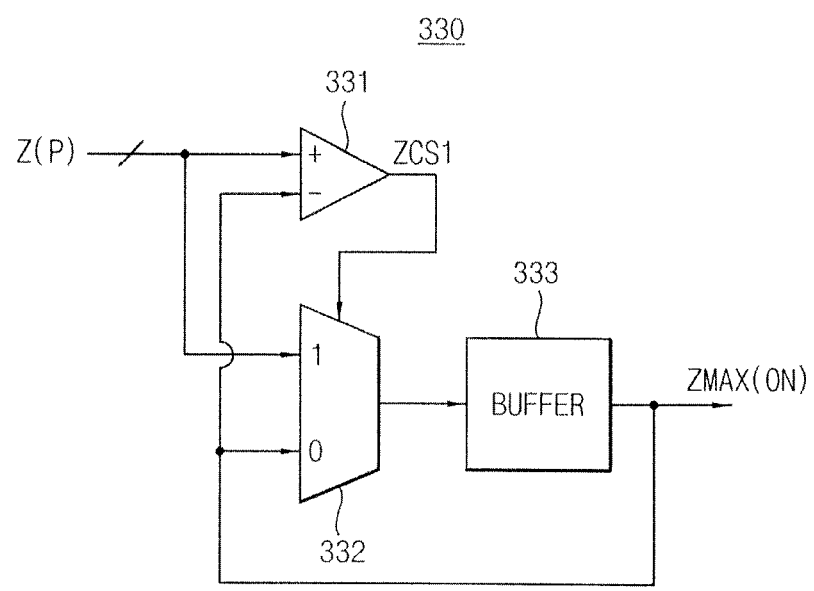
FIG. 12 illustrates a block diagram of an example of the tile maximum value generator in FIG. 11 according to some example embodiments.

FIG. 12 illustrates a block diagram of an example of the tile maximum value generator 330 in FIG. 11 according to some example embodiments.

In the example shown in FIG. 12, the tile maximum value generator 330 includes a comparator 331, a multiplexer 332, and a buffer 333.

The comparator 331 may compare a depth value Z(P) of a current pixel that is currently rasterized with a current on-chip tile maximum value Zmax(on) to output a comparison signal ZCS1, indicating a result of comparison of the depth value Z(P) of the current pixel with the current on-chip tile maximum value Zmax(on). For example, the comparator 331 may output the comparison signal ZCS1 of high level when the depth value Z(P) of the current pixel is greater than the current on-chip tile maximum value Zmax(on). As another example, the comparator 331 may output the comparison signal ZCS1 of low level when the depth value Z(P) of the current pixel is smaller than the current on-chip tile maximum value Zmax (on).

The multiplexer 332 may select the greater one of the depth value Z(P) of the current pixel and the current on-chip tile maximum value Zmax(on) in response to the comparison signal ZCS1. For example, the multiplexer 332 may select the depth value Z(P) of the current pixel when the comparison signal ZCS1 has a high level. As another example, the multiplexer 332 may select the current on-chip tile maximum value Zmax(on) when the comparison signal ZCS1 has a low level.

The buffer 333 may buffer an output of the multiplexer 332 to provide the on-chip tile maximum value Zmax(on). The buffer 333 may not be included in the tile maximum value generator 330 in other example embodiments.

The tile maximum value generator 330 may update the on-chip tile maximum value Zmax(on) whenever the depth value of the pixel is input.

Figure 13:
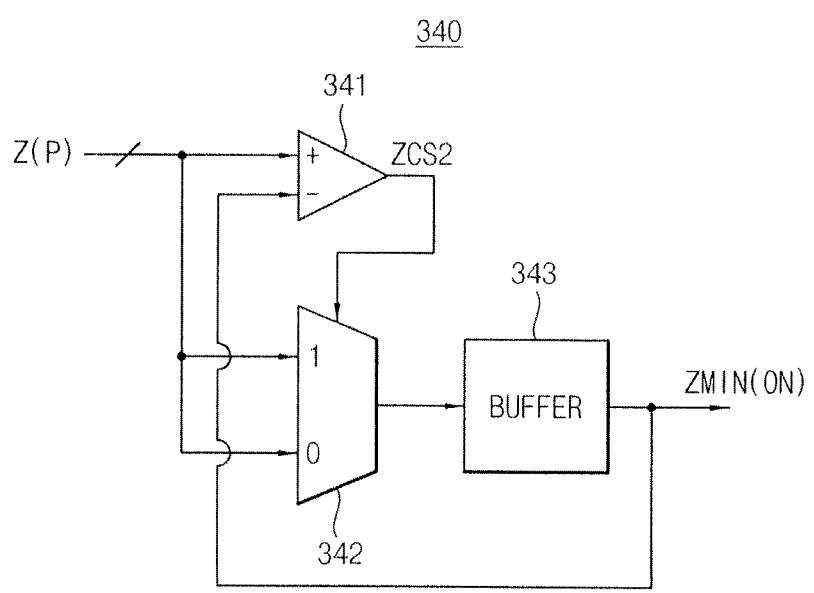
FIG. 13 illustrates a block diagram of an example of the tile minimum value generator in FIG. 11 according to some example embodiments.

FIG. 13 illustrates a block diagram of an example of the tile minimum value generator 340 in FIG. 11 according to some example embodiments.

In the example shown in FIG. 13, the tile minimum value generator 340 includes a comparator 341, a multiplexer 342, and a buffer 343.

The comparator 341 may compare the depth value Z(P) of the current pixel with a current on-chip tile minimum value Zmin(on) to output a comparison signal ZCS2, indicating a result of comparison of the depth value Z(P) of the current pixel with the current on-chip tile minimum value Zmin(on). For example, the comparator 341 may output the comparison signal ZCS2 of high level when the depth value Z(P) of the current pixel is greater than the current on-chip tile minimum value Zmin(on). As another example, the comparator 341 may output the comparison signal ZCS2 of low level when the depth value Z(P) of the current pixel is smaller than the current on-chip tile minimum value Zmin(on).

The multiplexer 342 may select the smaller one of the depth value Z(P) of the current pixel and the current on-chip tile minimum value Zmin(on) in response to the comparison signal ZCS2. For example, the multiplexer 342 may select the depth value Z(P) of the current pixel when the comparison signal ZCS2 has a low level. As another example, the multiplexer 342 may select the current on-chip tile minimum value Zmin(on) when the comparison signal ZCS2 has a high level.

The buffer 343 may buffer an output of the multiplexer 342 to provide the on-chip tile minimum value Zmin(on). The buffer 343 may not be included in the tile minimum value generator 340 in other example embodiments.

The tile minimum value generator 340 may update the on-chip tile minimum value Zmin(on) whenever the depth value of the pixel is input.

Figure 14:
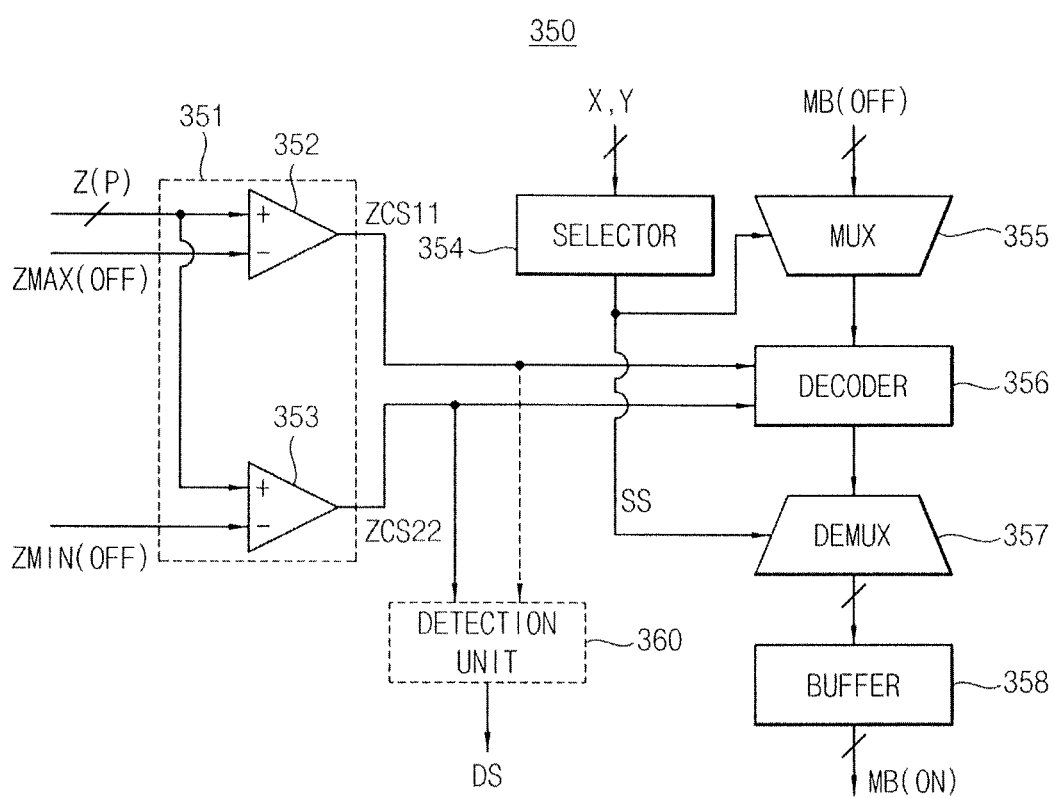
FIG. 14 illustrates a block diagram of an example of the mask bit generator in FIG. 11 according to some example embodiments.

FIG. 14 illustrates a block diagram of an example of the mask bit generator 350 in FIG. 11 according to some example embodiments.

In the example shown in FIG. 14, the mask bit generator 350 includes a comparison unit 351, a selector 354, a multiplexer 355, a decoder 356, a demultiplexer 357, a buffer 358, and a detection unit 360.

In the example shown in FIG. 14, the comparison unit 351 includes a first comparator 352 and a second comparator 353. The first comparator 352 may compare the depth value Z(P) of the current pixel with an off-chip tile maximum value Zmax(off) with respect to a previous object that is already rasterized, and may output a first comparison signal ZCS11. The second comparator 353 may compare the depth value Z(P) of the current pixel with an off-chip tile minimum value Zmin(off) with respect to the previous object, and may output a second comparison signal ZCS22. Logic levels of the first and second comparison signal ZCS11 and ZCS22 may determine which one of the visible region TVR, the uncertain region UR, and the occluded region TOR (see FIG. 8) that the current pixel belongs to.

The selector 354 may output a selection signal SS for selecting a mask bit of a pixel based on the location (2-D coordinates value x and y) of the pixel. The multiplexer 355 may select one corresponding to the current pixel of the off-chip mask bits MB(off) with respect to the previous object in response to the selection signal SS, and may provide the selected one to the decoder 356. The decoder 536 may decode the selected one (the mask bit corresponding to the current pixel) according to the logic levels of the first and second comparison signal ZCS11 and ZCS22. The demultiplexer 357 may demultiplex an output of the decoder 356 in response to the selection signal SS. The demultiplexer 357 may update the mask bit corresponding to the current pixel, and may output all the mask bits in one tile to the buffer 358. The buffer 358 may output all the mask bits in one tile as the on-chip mask bit MB(on).

The detection unit 360 may receive the first and second comparison signal ZCS11 and ZCS22, and may output a detection signal DS indicating which one of the visible region TVR, the uncertain region UR, and the occluded region TOR (see FIG. 8) that the current pixel belongs to, according to the logic levels of the first and second comparison signals ZCS11 and ZCS22. For example, when the depth value Z(PX) of the current pixel is smaller than the off-chip tile minimum value Zmin(off), the first and second comparison signal ZCS11 and ZCS22 may have low levels, and thus the detection unit 360 may output the detection signal DS indicating the current pixel belongs to the visible region TVR. As another example, when the depth value Z(P) of the current pixel is greater than the off-chip tile minimum value Zmin(off) and smaller than the off-chip tile maximum value Zmax(off), the first comparison signal ZCS11 may have a high level and the second comparison signal ZCS22 may have a low level, and thus the detection unit 360 may output the detection signal DS indicating the current pixel belongs to the uncertain region TVR. As another example, when the depth value Z(P) of the current pixel is greater than the off-chip tile maximum value Zmax (off), the first and second comparison signals ZCS11 and ZCS22 may have high levels, and thus the detection unit 360 may output the detection signal DS indicating the current pixel belongs to the occluded region TOR.

Figure 15:
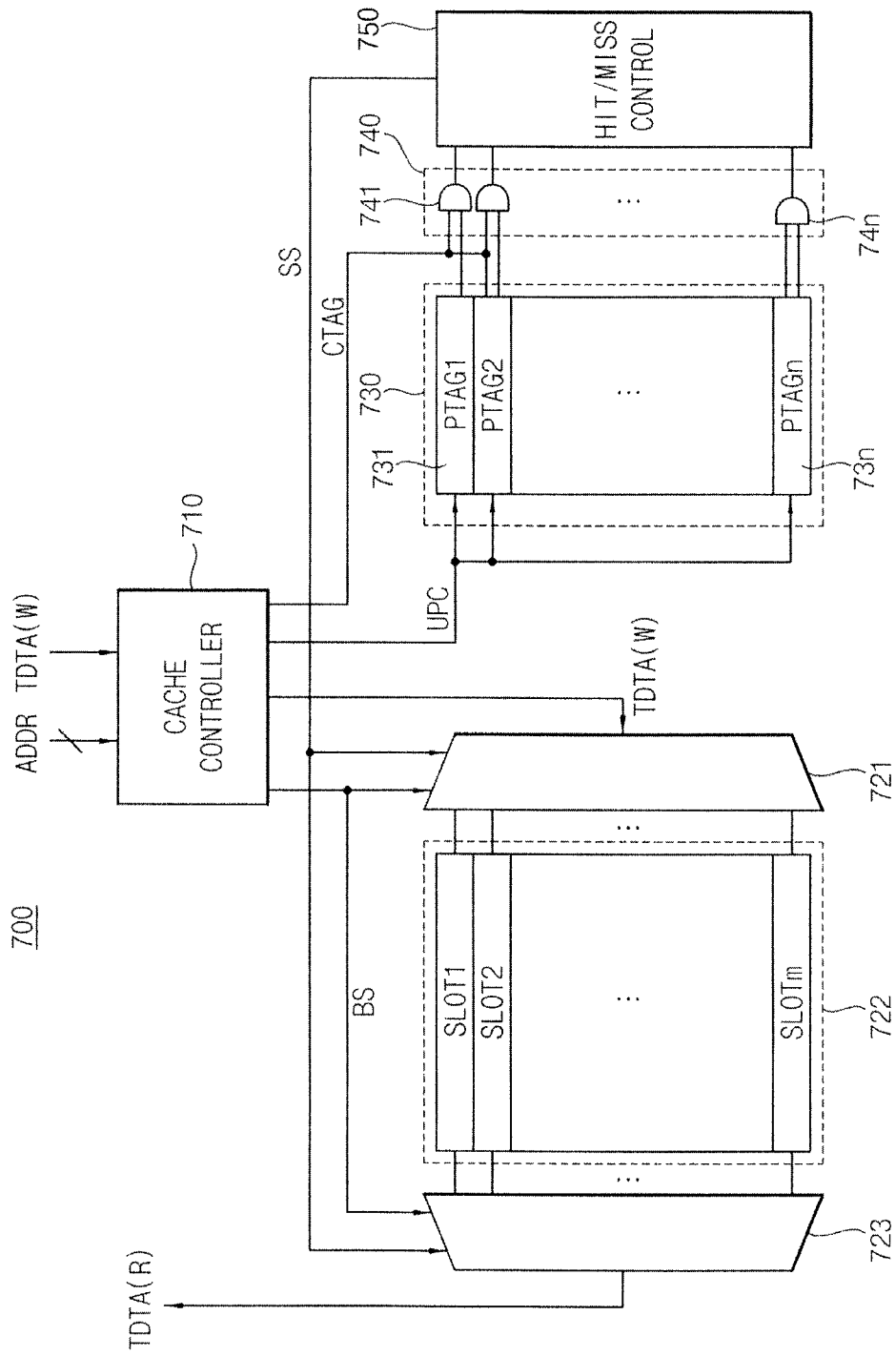

FIG. 15 illustrates a block diagram of an example of the UEZT cache memory 700 in FIG. 5 according to some example embodiments.

In the example shown in FIG. 15, the UEZT cache memory 700 includes a cache controller 710, a demultiplexer 721, a tile data storing unit 722, a multiplexer 723, a tag storing unit 730, a tag comparison unit 740, and a cache hit/miss control unit 750.

The cache controller 710 may receive an address signal ADDR and may receive write tile data TDTA(W), and may generate an update control signal UPC and a block selection signal BS in response to the address signal ADDR. The address signal ADDR may be portions of the 2-D coordinate values x and y provided from the UEZT unit 300 of FIG. 11. When the 2-D coordinate values x and y are 32-bit floating point values, the address signal ADDR may include upper bits of 2-D coordinate values x and y. The cache controller 710 may also generate the write tile data TDTA(W). The write tile data TDTA(W) may be provided from the UEZT unit 300 of FIG. 11.

The tile data storing unit 722 may include a plurality of slots SLOT1~SLOTm. Each of the slots SLOT1~SLOTm may store a same bit of data with respect to each other. For example, each of the slots SLOT1~SLOTm may store tile data TDAT corresponding to four tiles (referring to FIG. 8). As described above, the tile data TDTA may include the off-chip tile maximum value Zmax(off), the off-chip tile minimum value Zmin(off), and the mask bits MB of the pixels in one tile as a data set.

The tag storing unit 730 may include a plurality of tag storing elements 731~73n. Each of the tag storing elements 731~73n may store a corresponding one of previous tag values PTAG1~PTAGn. Each of the previous tag values PTAG1~PTAGn may indicate whether each tile data with respect to the previous object is valid or not. The tag comparison unit 740 may include a plurality of AND gates 741~74n. Each of the AND gates may receive a corresponding one of the previous tag values PTAG1~PTAGn and a current tag value CTAG. The cache hit/miss control unit 750 may provide a set selection signal to the demultiplexer 721 and the multiplexer 723 based on each output of the AND gates 741~74n.

The multiplexer 723 may provide the UEZT unit 300 in FIG. 11 with the tile data with respect to the current tile, stored in the tile data storing unit 722, as the off-chip tile data TDTA(off) in response to the block selection signal BS from the cache controller 710 and the set selection signal SS from the cache hit/miss control unit 750. The UEZT unit 300 may perform the visibility test on the pixels in the current tile, and may provide the UEZT cache memory 700 with the test result as the on-chip tile data TDTA(on). The demultiplexer 721 may update the on-chip tile data TDTA(on) to corresponding tile data in the tile data storing unit 722, in response to the set selection signal SS and the block selection signal BS. In addition, the tag comparison unit 740 may compare each of the previous tag values PTAG1~PTAGn with the current tag value CTAG to provide the cache hit/miss control unit 750 with an output signal indicating whether each of the previous tag values PTAG1~PTAGn is identical to the current tag value CTAG.

Figure 17:
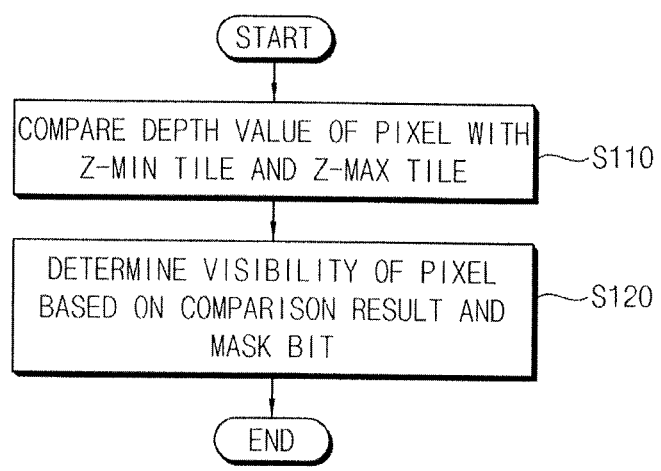
FIG. 17 illustrates a flow chart of a method of early testing visibility of pixels according to some example embodiments.
Figure 18:
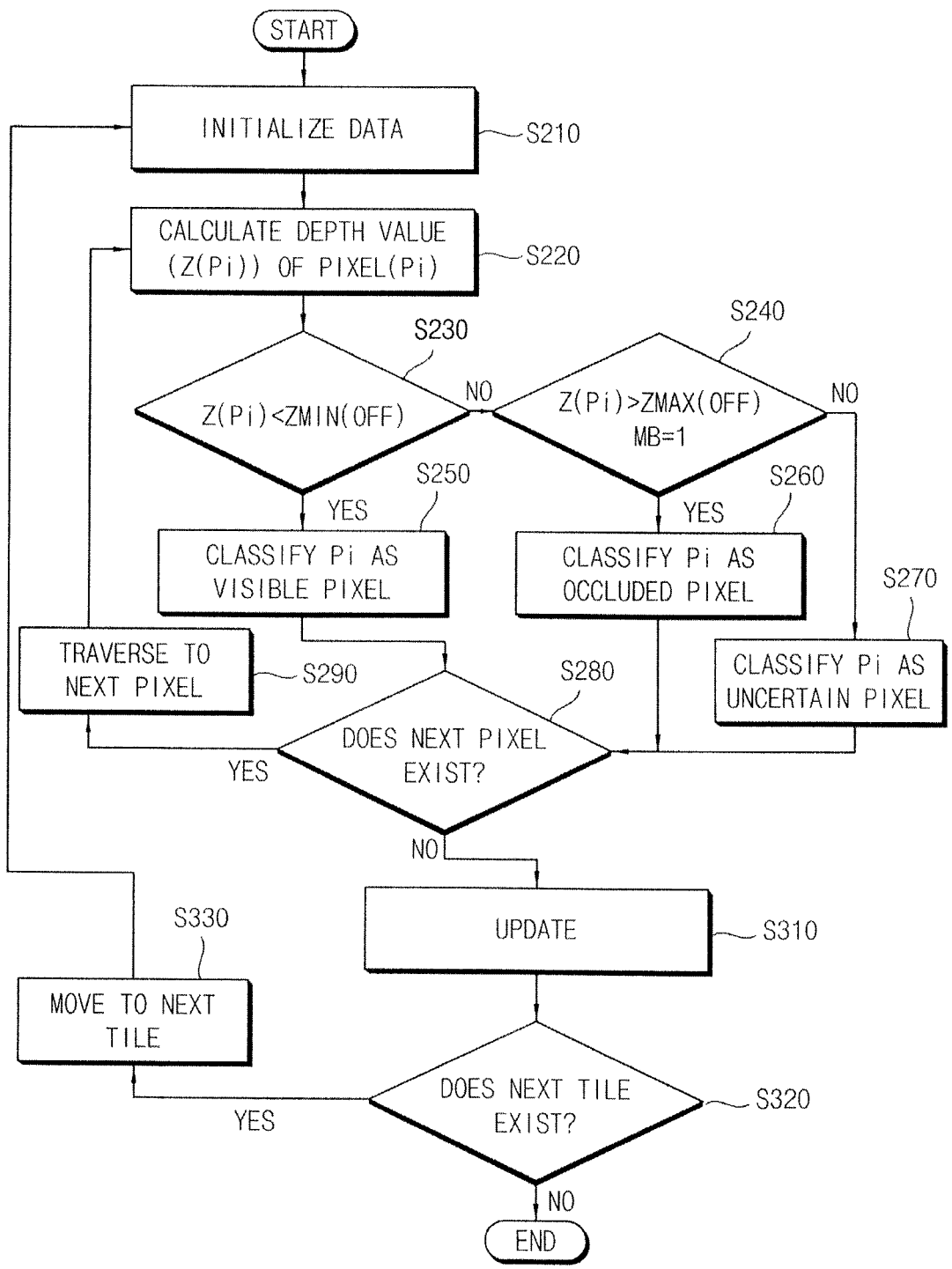
FIG. 18 illustrates a flow chart of a method of early testing visibility of pixels according to some example embodiments.

FIG. 16 illustrates an algorithm of operation performed in the UEZT unit according to some example embodiments. The algorithm of FIG. 16 will be described in detail with reference to FIG. 18. FIG. 17 illustrates a flow chart of a method of early testing visibility of pixels according to some example embodiments. FIG. 18 illustrates a flow chart of a method of early testing visibility of pixels according to some example embodiments.

Hereinafter, a method of early testing visibility of pixels in accordance with some example embodiments will be described with reference to FIGS. 8 and 17.

In an example method of early testing visibility of pixels, each depth value of pixels in a current tile (which is currently rasterized) is compared with the tile minimum value ZNT and the tile maximum value ZXT as illustrated in FIG. 8 (S110). When the current tile is a tile that is initially rasterized, the tile minimum value ZNT and the tile maximum value ZXT may respectively have predetermined values. In addition, when the triangle 192 is an object that is not initially drawn, the tile minimum value ZNT and the tile maximum value ZXT may respectively be the off-chip tile minimum value Zmin(off) and the off-chip tile maximum value Zmax(off) with respect to the previous tile that is already drawn. The visibility of each pixel is determined based on the comparison result, and the mask bit MB which indicates whether each pixel is drawn or not (S210). For example, when a pixel is located in the visible region TVR, the pixel is determined as a visible pixel like the first pixel PX1 in FIG. 8. As another example, when a pixel is located in the occluded region TOR and a mask bit is a high level, the pixel is determined as an occluded pixel (like the second pixel PX2 in FIG. 8). As another example, when a pixel is located in the occluded region TOR and a mask bit is a low level, the pixel is determined as an uncertain pixel (like the third pixel PX3 in FIG. 8). As another example, when a pixel is located in the uncertain region UR, the pixel is determined as an uncertain pixel (like the fourth pixel PX4 in FIG. 8). The visible pixel like the first pixel PX1 is to be visible to a viewer 193. Thus, there is no need for accessing the depth buffer as to the visible pixel when the depth test is performed in the raster operation unit 500. The occluded pixel (like the second pixel PX2) is to be invisible to the viewer 193. Thus, there is no need for accessing the texture buffer, the depth buffer, and the color buffer in the subsequent processing as to the occluded pixel. Therefore, performance of the graphic processor may be enhanced by providing for significant reductions in memory access (buffer access).

The flow chart of FIG. 18 illustrates the algorithm of FIG. 16 in detail.

Hereinafter, there will be description about a method of early testing visibility of pixels with reference to FIGS. 3, 5, 8 through 16, and 18.

In the example shown in FIG. 18, the on-chip tile maximum value Zmax(on), the on-chip tile minimum value Zmin(on), and the mask bits MB are initialized (S210). A depth value Z(Pi) of each pixel Pi in one tile is calculated (S220). It is determined whether the depth value Z(Pi) of the pixel Pi is greater than the off-chip tile minimum value Zmin(off) (S230). When the depth value Z(Pi) of the pixel Pi is smaller than the off-chip tile minimum value Zmin(off) (Yes in operation S230), the pixel Pi is determined as a visible pixel (like the first pixel PX1 in FIG. 8) (S250). When the depth value Z(Pi) of the pixel Pi is greater than the off-chip tile minimum value Zmin(off) (No in operation S230), it is determined whether the depth value Z(Pi) of the pixel Pi is greater than the off-chip tile maximum value Zmax(off) and the mask bit MB has a high level (S240). When the depth value Z(Pi) of the pixel Pi is greater than the off-chip tile maximum value Zmax (off) and the mask bit MB has a high level (Yes in operation S240), the pixel Pi is determined as an occluded pixel (like the second pixel PX2 in FIG. 8) (S290). When the depth value Z(Pi) of the pixel Pi is smaller than the off-chip tile maximum value Zmax(off) or the mask bit MB has a low level (No in operation S240), the pixel Pi is determined as an uncertain pixel (like the third pixel PX3 or the fourth pixel PX4 in FIG. 8) (S270). When determining the current pixel P1 is completed, it is determined whether a next pixel exists (S280). When the next pixel does not exist (No in operation S280), the on-chip tile maximum value Zmax(on), the on-chip tile minimum value Zmin(on), and the mask bits MB with respect to the current tile are updated (S310). When the next pixel exists (Yes in operation S280), traversal is made to the next pixel (S290), and operations S220~S280 are repeated. When the update is completed in operation 5310, it is determined whether a next tile to be rasterized exists (S320). When the next tile exists (Yes in operation S320), traversal is made to the next tile (S330), and operations S210~S320 are repeated. When the next tile does not exist (No in operation S320), the procedure ends.

Figure 19:
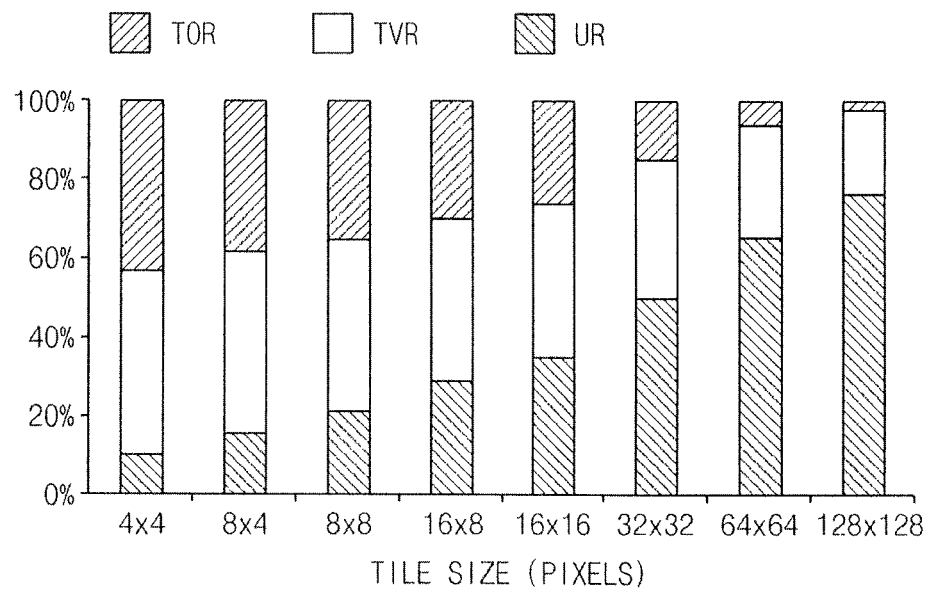
FIG. 19 illustrates a simulation diagram of performance of the UEZT unit when a number of pixels in one tile varies.

FIG. 19 illustrates a simulation diagram of performance of the UEZT unit when a number of pixels in one tile varies.

Referring to FIG. 19, it is noted that respective number of pixels included in the occluded region TOR, the visible region TVR, and the uncertain region UR vary as a number of pixels included in one tile increase.

Figure 20:
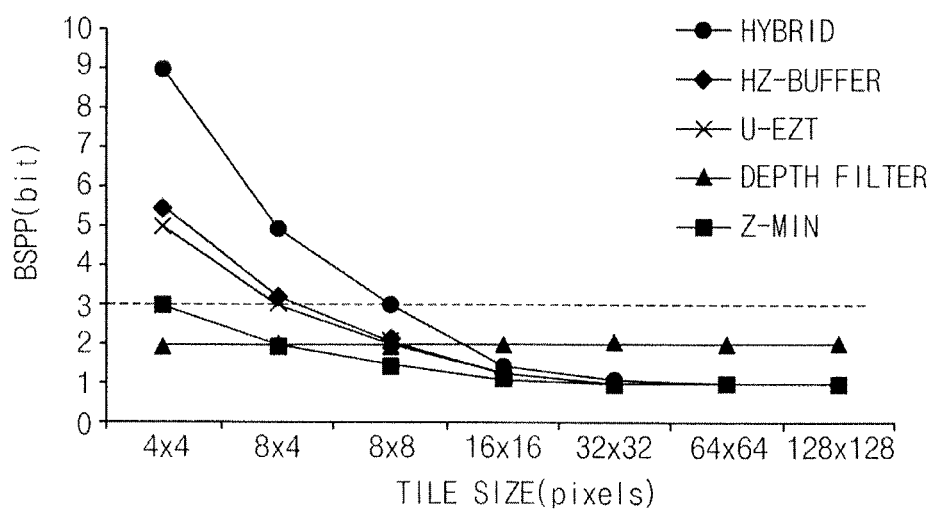
FIG. 20 illustrates another simulation diagram of performance of the UEZT unit when a number of pixels in one tile varies.
Figure 21A:
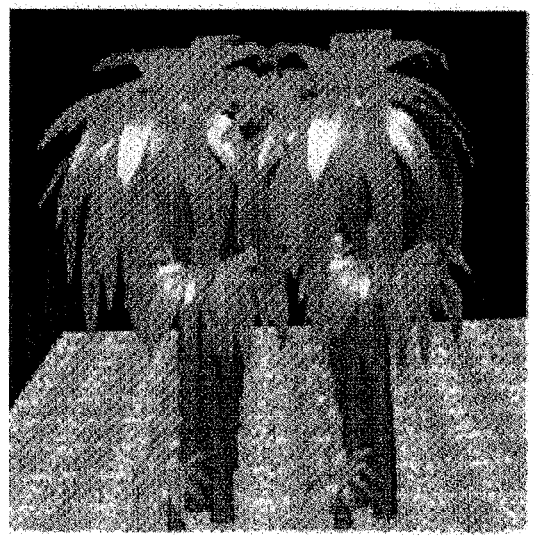
FIGS. 21A through 21D illustrate test scenes for testing performance of the UEZT unit according to some example embodiments.
Figure 21B:
Figure 21C:
Figure 21D:
Figure 22A:
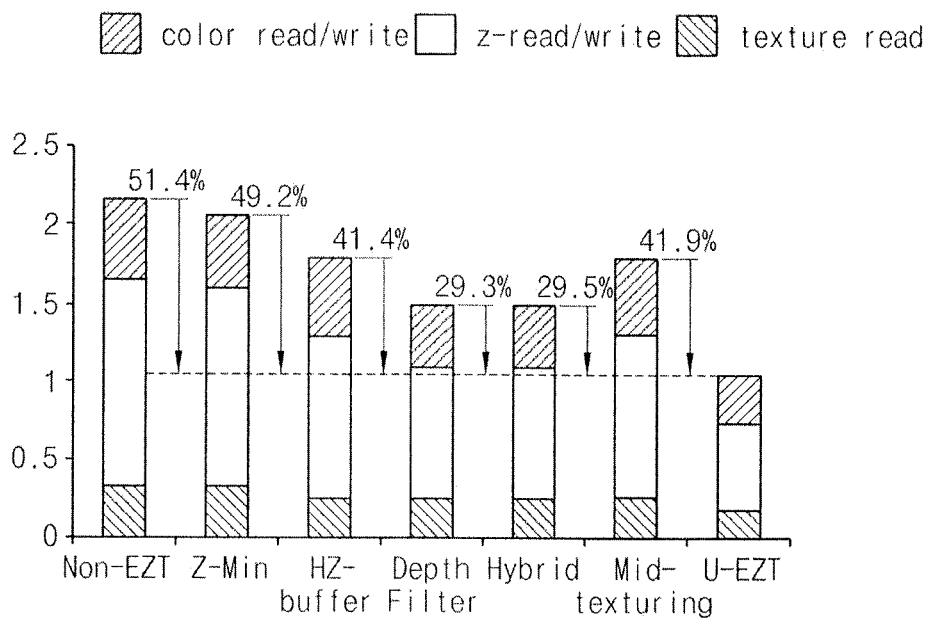
FIGS. 22A through 22D illustrate memory accesses of the UEZT unit and various comparative techniques when respectively rendering the test scenes of FIGS. 21A through 21D.
Figure 22B:
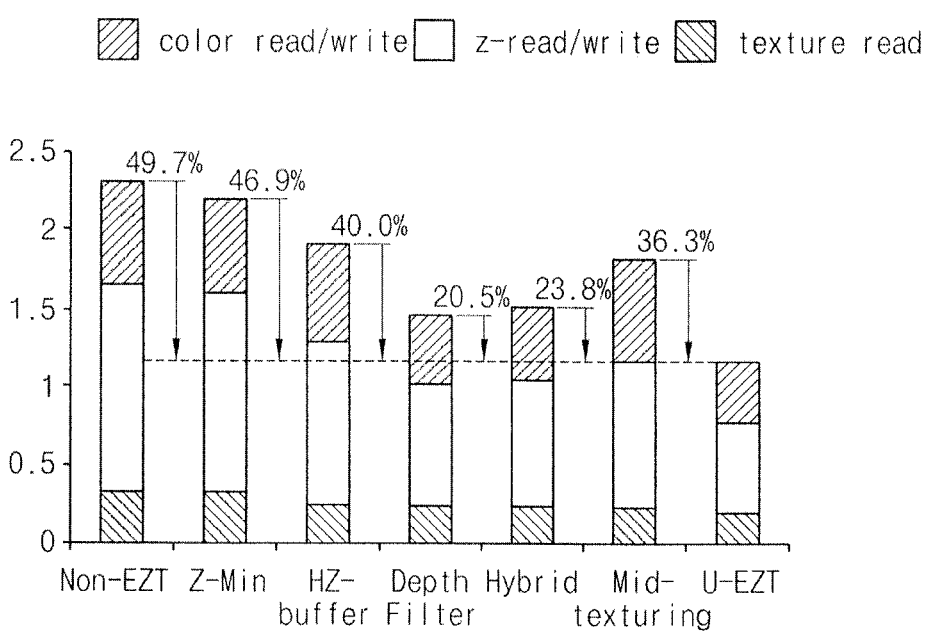
Figure 22C:
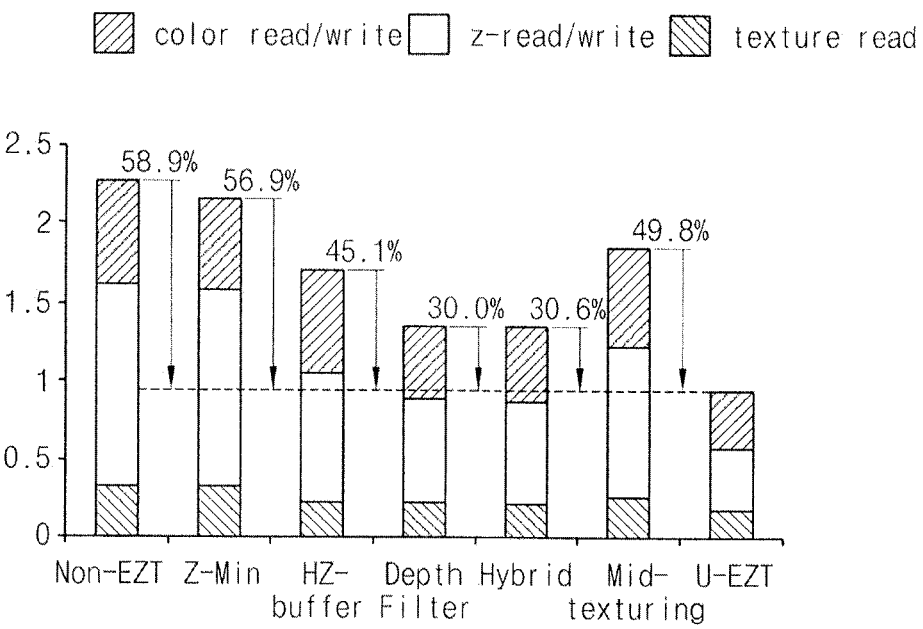
Figure 22D:
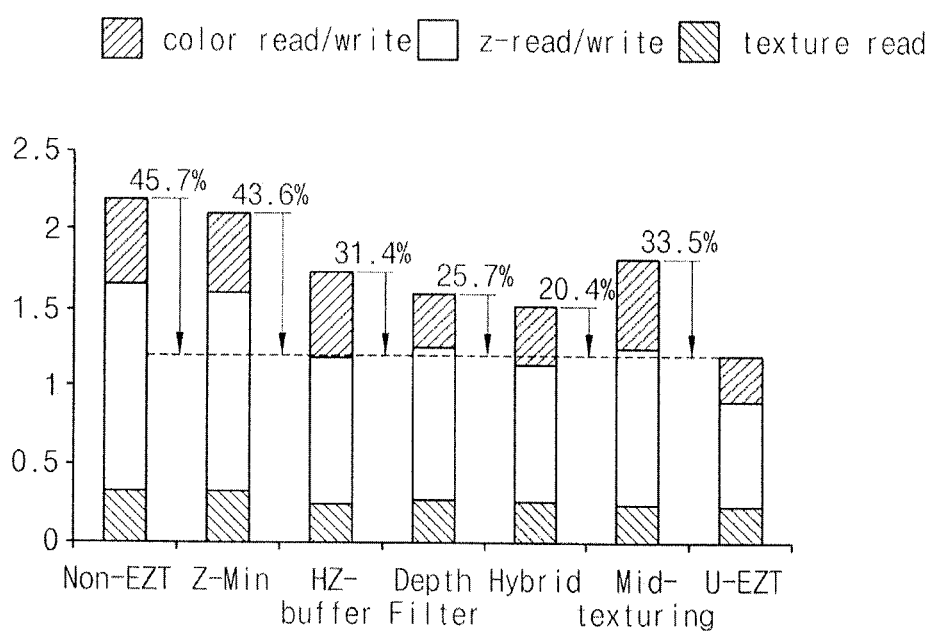

FIG. 20 illustrates another simulation diagram of performance of the UEZT unit when a number of pixels in one tile varies.

In FIG. 20, bits of storage per pixel (BSPP) are described for illustrating respective BSPP according to example embodiments and comparative techniques.

The BSPP may be represented by Expression 1 below:

$$BSPP=((Nmax+Nmin)\times 32\ bit+Nmask\times 1\ bit)/Npixel \quad \text{[Expression 1]}$$

In Expression 1, Nmax denotes a 32 bit floating point tile maximum value, Nmin denotes a 32 bit floating point tile minimum value, Nmask denotes a number of mask bits in one tile, and Npixel denotes a number of pixels in one tile.

In FIG. 20, a legend U-EZT denotes a BSPP of the UEZT unit according to some example embodiments, a legend HYBRID denotes a BSPP of one comparative depth test method using fixed tile maximum value and tile minimum value during one frame, a legend HZ-BUFFER denotes a BSPP of one comparative depth test method using hierarchical depth buffer, a legend DEPTH FILTER denotes a BSPP of one comparative depth test method using a depth filter which has a fixed location, and a legend Z-MIN denotes a BSPP of one comparative depth test method using only tile minimum value.

Referring to FIG. 20, it is noted that the UEZT unit according to some example embodiments shows the greatest BSPP in an 8×4 tile size.

FIGS. 21A through 21D illustrate test scenes for testing performance of the UEZT unit according to some example embodiments, while FIGS. 22A through 22D illustrate memory accesses of the UEZT unit and various comparative techniques when respectively rendering the test scenes of FIGS. 21A through 21D.

FIGS. 22A through 22D illustrate color read/write, depth read/write (denoted as z-read/write), and texture read, used for rendering the test scenes of FIGS. 21A through 21D. The color read/write corresponds to the color cache 630 accessing the external memory 650, the depth read/write corresponds to the depth cache accessing the external memory 650, and the texture read corresponds to the texture cache 610 accessing the external memory 650. Increased access to the external memory 650 may be expected to lead to increased latency. Therefore, the graphic processor may be expected to exhibit better performance when the access to the external memory 650 is decreased.

In FIGS. 22A through 22D, a legend U-EZT denotes a case of a depth test being not performed, and a legend Mid-texturing denotes a case when an early depth test is performed in a depth test unit.

Referring to FIGS. 22A through 22D, it is noted that the UEZT unit according to some example embodiments may reduce memory accesses to the external memory 650 much more than various comparative techniques when used for rendering the test scenes of FIGS. 21A through 21D.

As described above, tile-based rendering is mainly described with reference to FIGS. 1 through 22D. However, example embodiments of the inventive concept may be applicable to an early depth test that is performed by the unit of tile or by the unit of triangle. When the early depth test is performed by the unit of triangle, the UEZT unit in FIG. 3 may be connected to the triangle setting unit 130 in FIG. 2. In addition, a pixel block, which includes a plurality of pixels such as 2×2 pixels, may be introduced, a representative pixel may be defined of the pixels, and the early depth test may be performed on a tile including a plurality of pixel blocks. For example, the maximum depth value of depth values of the 2×2 pixels may be defined as the representative maximum depth value of the pixel block, and the minimum depth value of depth values of the 2×2 pixels may be defined as the representative minimum depth value of the pixel block.

Figure 23:
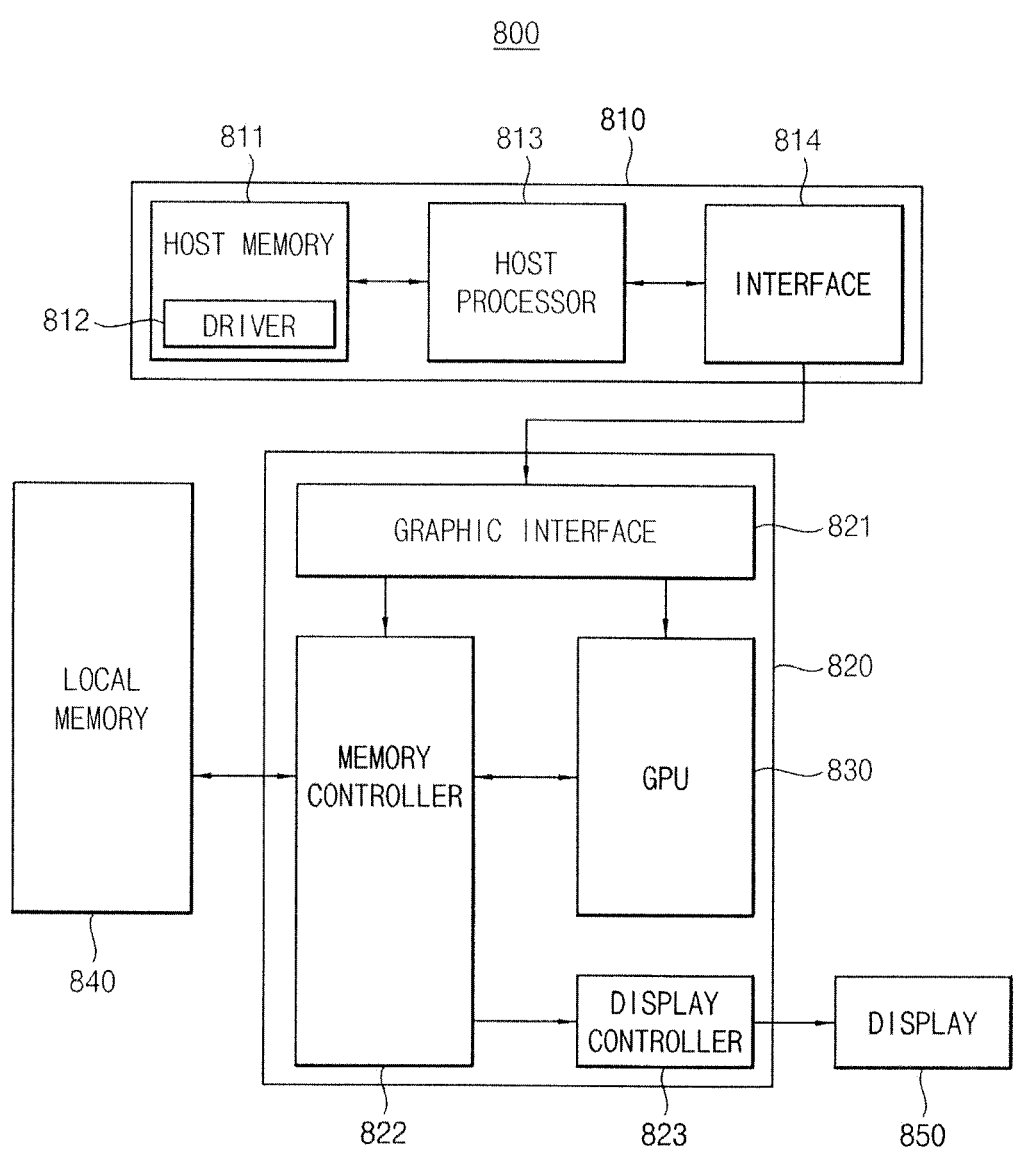
FIG. 23 illustrates a block diagram illustrating a computing system including a graphic processor according to some example embodiments.

FIG. 23 illustrates a block diagram of a computing system 800 including a graphic processor according to some example embodiments.

In the example shown in FIG. 23, the computing system 800 includes a host computer (or a host) 810, a graphics subsystem 820, a local memory 840, and a display 850.

The computing system 800 may be, e.g., a desktop computer, server, laptop computer, personal digital assistant (PDA), palm-sized computer, tablet computer, game console, cellular phone, smart phone, or the like. The host computer 810 may include a host processor 813 that may include a system memory controller to interface directly to a host memory 811, or may communicate with the host memory 811 through a host interface 814. The host interface 814 may be an input/output (I/O) interface.

A driver 812 may interface between processes of the host processor 813 and the graphics subsystem 820. The host computer 810 may communicate with the graphics subsystem 820 through the host interface 814 and a graphic interface 821.

The graphics subsystem 820 may include the graphic interface 821, a graphic processing unit (GPU) 830, a memory controller 822, and a display controller 823. The GPU 830 may perform a series of graphics executions described with reference to FIGS. 1 through 22. The GPU 830 may include, e.g., the geometry engine 100, the rasterizer 200, the pixel shader (or, fragment shader) 400, the raster operation unit 500, and the cache unit 600 in FIG. 1, and may receive the vertex data VDTA and may process the vertex data VDTA on tile basis to selectively generate the fragment data FDTA. The memory controller 822 may control memory access between the local memory 840 and the GPU 830. The display controller 850 may control the display 850 such that desired images may be displayed under control of the memory controller 822.

Figure 24:
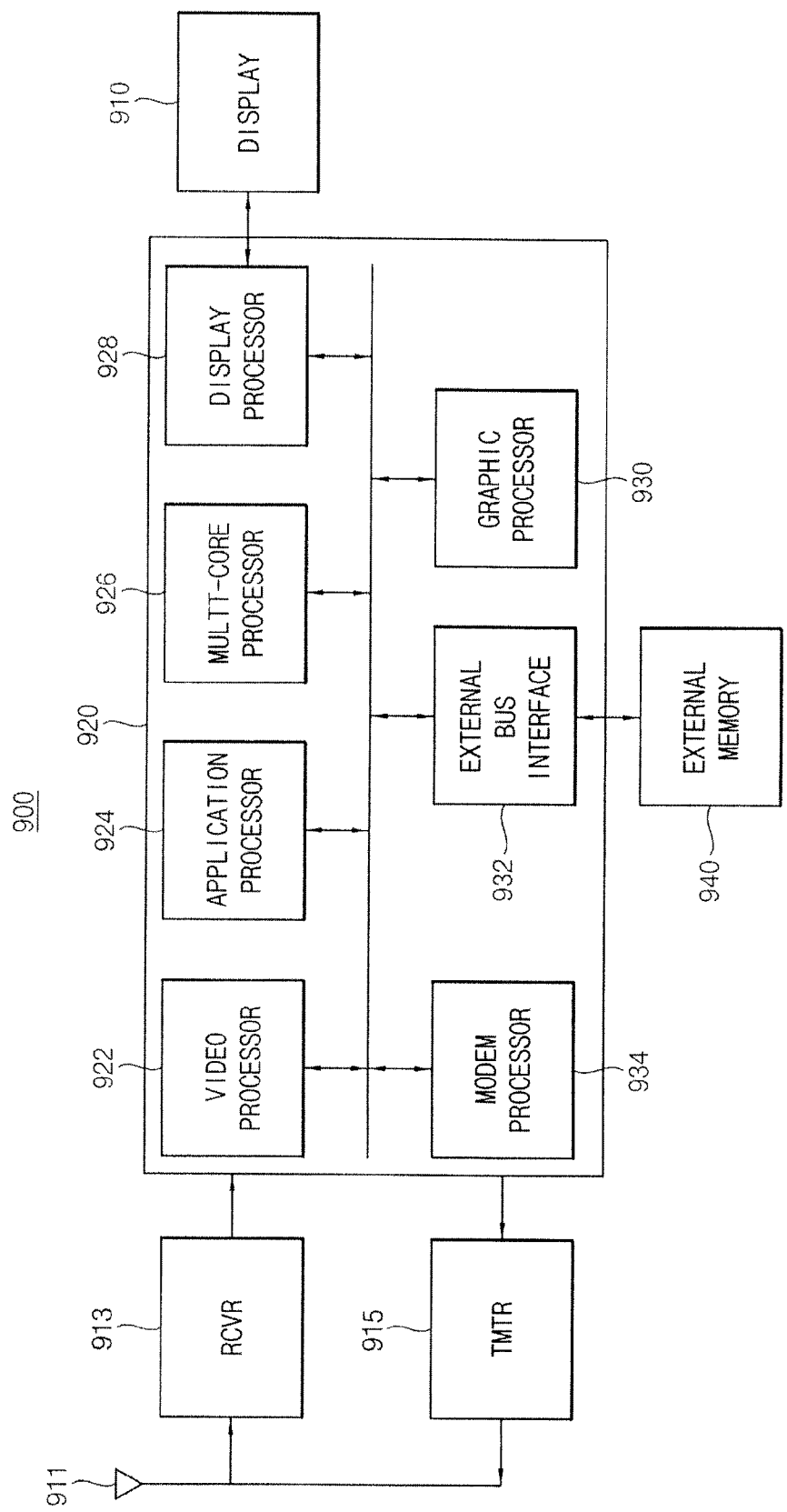
FIG. 24 illustrates a block diagram of a wireless communication device including a graphic processor according to some example embodiments.

FIG. 24 illustrates a block diagram of a wireless communication device including a graphic processor according to some example embodiments.

A wireless communication device 900 may be, e.g., a cellular phone, a terminal, a handset, a personal digital assistant (PDA), a laptop computer, a video game unit, or some other device. The wireless communication device 900 may use Code Division Multiple Access (CDMA), Time Division Multiple Access, such as Global System for Mobile Communications (GSM), or some other wireless communication standard.

The wireless communication device 900 may provide bi-directional communication via a receive path and a transmit path. On the receive path, signals transmitted by one or more base stations may be received by an antenna 911 and provided to a receiver (RCVR) 913. The receiver 913 may condition and digitize the received signal and provides samples to a digital section 920 for further processing. On the transmit path, a transmitter (TMTR) 915 may receive data to be transmitted from the digital section 920, process and condition the data, and generate a modulated signal, which is transmitted via the antenna 911 to one or more base stations.

The wireless communication device 900 may be implemented with one or more digital signal processors (DSPs), micro-processors, reduced instruction set computers (RISCs), etc. The digital section 920 may also be fabricated on one or more application specific integrated circuits (ASICs) or some other type of integrated circuits (ICs).

The digital section 920 may include a modem processor 934, a video processor 922 an application processor 924, a controller/multi-core processor 926, a display processor 928, a graphic processor 930, and external bus interface 932.

The graphic processor 930 may perform processing on graphic applications. In general, the graphics processor 930 may include any number of processing units or modules for any set of graphics operations. The graphics processor 930 and its components may be implemented in various hardware units, such as ASICs, digital signal processing devices (DSPs), programmable logic devices (PLDs), field programmable gate array (FPGAs), processors, controllers, micro-controllers, microprocessors, and other electronic units. Certain portions of the graphics processor 930 may be implemented in firmware and/or software. For example, a control unit may be implemented with firmware and/or software modules (e.g., procedures, functions, and so on) that perform functions described herein. The firmware and/or software codes may be stored in a memory (e.g., external memory 940) and executed by a processor (e.g., multi-core processor 926). The memory may be implemented within the processor or external to the processor.

The graphics processor 930 may implement a software interface such as Open Graphics Library (OpenGL), Direct3D, etc. The graphic processor 930 may include the geometry engine 100, the rasterizer 200, the pixel shader (or, fragment shader) 400, the raster operation unit 500, and the cache unit 600 in FIG. 1, may receive the vertex data VDTA, and may process the vertex data VDTA on tile basis to selectively generate the fragment data FDTA.

The controller/multi-core processor 926 may include at least two cores, and may distribute workload to the two cores and process the workload.

Figure 25:
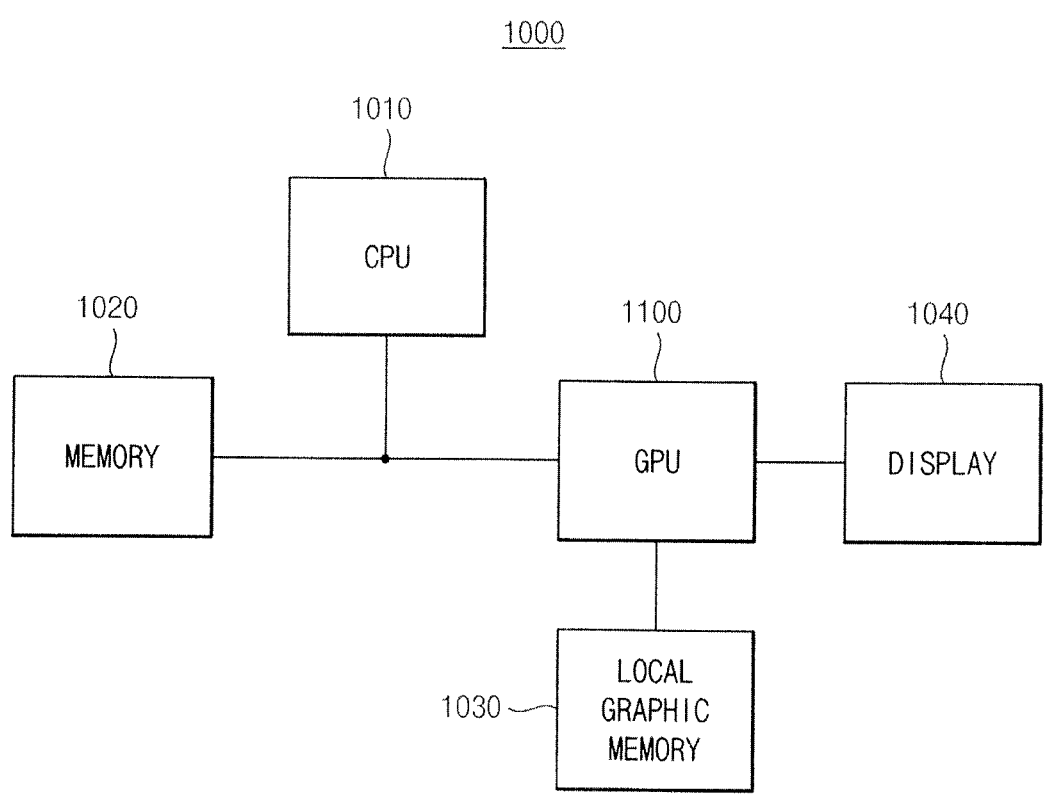
FIG. 25 illustrates a block diagram of a computer system including a graphic processor according to some example embodiments.

FIG. 25 illustrates a block diagram of a computer system 1000 including a graphic processor according to some example embodiments.

Referring to FIG. 25, the computer system 1000 depicts the components of a basic computing system providing the execution platform for certain hardware-based and software-based functionality. The computer system 1000 may include at least one CPU 1010, a system memory 1020, and at least one graphics processor unit (GPU) 1100. The CPU 1010 may be coupled to the system memory 1020 via a bridge component/memory controller (not shown), or may be directly coupled to the system memory 1020 via a memory controller (not shown) internal to the CPU 1010. The GPU 1100 may be coupled to a display 1040. One or more additional GPUs may optionally be coupled to system 1000 to further increase its computational power. The GPU(s) 1100 may be coupled to the CPU 1010 and the system memory 1020. The computer system 1000 may be implemented as, for example, a desktop computer system or server computer system, having a powerful general-purpose CPU 1010 coupled to a dedicated graphics rendering GPU 1100. In such an embodiment, components may be included that add peripheral buses, specialized graphics memory, IO devices, and the like. Similarly, the computer system 1000 may be implemented as a handheld device (e.g., cell phone, etc.), or a set-top or video game console device. The CPU 1010 may include two or more cores, and may distribute workload to the two or more cores and process the workload.

The GPU 1100 may be implemented as a discrete component, a discrete graphics card designed to couple to the computer system 1000 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 1030 may be included for the GPU 1100 for high bandwidth graphics data storage.

The GPU 1100 may include the geometry engine 100, the rasterizer 200, the pixel shader (or, fragment shader) 400, the raster operation unit 500, and the cache unit 600 in FIG. 1, may receive the vertex data VDTA, and may process the vertex data VDTA on tile basis to selectively generate the fragment data FDTA.

As described above, example embodiments relate to three-dimensional (3-D) graphics, and more particularly to a graphic processor and a method of early testing visibility. By way of summation and review, as the resolution of the display devices increase (e.g., in handheld devices), 3D graphics applications may require more processing power in a SoC environment. Although rapid advances in VLSI technology have delivered greater power, memory subsystems may still present bottlenecks in a 3D graphic system. Furthermore, the rendering operations performed by a 3D graphic processors tend to be more memory-intensive than those of other IP cores in a SoC system. Therefore, 3D graphics processors should utilize the available memory bandwidth efficiently by reducing the number of memory accesses as far as possible. Embodiments may reduce the access to the external memory by performing unified early depth test, which may use a tile maximum value, a tile minimum value, and mask bit indicating whether corresponding pixel is drawn or not. As described above, the access to the external memory may be reduced greatly by performing unified early depth test, and thus, example embodiments may be applicable to various fields requiring graphic processors. Some example embodiments may provide a graphic processor which is capable of reducing memory access. Some example embodiments may provide a method of early testing visibility of pixels to reduce memory access.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Further, embodiments may be applied to a tangible article of manufacture having encoded therein machine-accessible instructions that, when executed by a machine, cause the machine to perform a method as set forth herein. Accordingly, it will be understood by those of skill in the art that various changes in form and details may be made without departing from the spirit and scope of the present invention as set forth in the following claims.

What is claimed is:

1. A graphic processor, comprising:
a rasterizer to process vertex data to generate fragment data based on a maximum depth value, a minimum depth value, and a mask bit of each pixel included in one tile, each mask bit indicating whether each pixel is drawn or not, the vertex data including three dimensional information of the pixels;
a pixel shader to process the fragment data to generate color data; and
a raster operation unit to convert the color data to pixel data to be displayed, wherein, for previous and current objects with respect to the one tile, the current object being currently rasterized, and the previous object being rasterized prior to the current object, a tile minimum value and a tile maximum value for the one tile are obtained from the previous object,
wherein the rasterizer is to classify each pixel in one of a visible region, an uncertain region, or an occluded region based on a depth value of said each pixel, the rasterizer to classify a pixel in the uncertain region when the depth value of the pixel is between the tile minimum value and the tile maximum value, and
wherein the pixel shader is to determine a visibility of the pixel classified in the uncertain region based on a stencil test and a depth test, the pixel classified in the uncertain region determined to be a visible pixel when the pixel passes both the stencil and depth tests, and
wherein the rasterizer is to determine a pixel in the occluded region as an uncertain pixel when the mask bit has a first value and is to determine the pixel in the occluded region as an occluded pixel when the mask bit has a second value.

2. The graphic processor as claimed in claim 1, wherein:
each of the pixels is located in one of the visible region, the uncertain region, or the occluded region in a three dimensional space, based on the maximum depth value and the minimum depth value, the minimum depth value corresponding to the tile minimum value, the maximum depth value corresponding to the tile maximum value, a first boundary between the first area and the second area being determined by the tile minimum value, and a second boundary between the second area and the third area being determined by the tile maximum value, and
when the previous object with respect to one tile is rasterized prior to the current object, the rasterizer compares each depth value of pixels of the current object with a first tile maximum value and a first tile minimum value of the previous object to determine whether each pixel of the current object is occluded or not, a pixel having a depth value greater than the first tile maximum value and which is drawn of a pixel of the previous object being occluded.

3. The graphic processor as claimed in claim 2, wherein:
the tile maximum value is updated whenever each depth value of pixels in one tile is compared with the tile maximum value, and
the tile minimum value is updated after all depth values of pixels in the one tile are compared with the tile minimum value.

4. The graphic processor as claimed in claim 1, wherein the rasterizer includes:
a traversal processor to perform traversal processing on the vertex data;
a span processor to perform span processing on an output of the traversal processor; and
a unified early depth tester (UEZT) to perform a depth test on the pixels to determine visibility of each pixel based on each depth value of pixels in the one tile output from the span processor, and to determine a logic level of each mask bit based on whether each pixel is drawn or not.

5. The graphic processor as claimed in claim 4, wherein the UEZT includes:
a tile maximum value generator to generate an on-chip tile maximum value of the current object based on each depth value of the pixels;
a tile minimum value generator to generate an on-chip tile minimum value of the current object based on each depth value of the pixels; and
a mask bit generator to generate an on-chip mask bit of the current object based on an off-chip tile maximum value, an off-chip tile minimum value, and an off-chip mask bit of the previous object, the off-chip tile maximum value corresponding to the tile maximum value of the previous object, and the off-chip tile minimum value corresponding to the tile minimum value of the previous object.

6. The graphic processor as claimed in claim 5, wherein:
the tile maximum value generator includes:
a comparator to output a comparison signal based on a first depth value of a current pixel and a second depth value of a previous pixel; and
a selection circuit to select the greater of the first depth value and the second depth value to provide the on-chip tile maximum value, in response to the comparison signal, and
the tile minimum value generator includes:
a comparator to output a comparison signal based on a first depth value of a current pixel and a second depth value of a previous pixel; and
a selection circuit to select the smaller of the first depth value and the second depth value to provide the on-chip tile minimum value, in response to the comparison signal.

7. The graphic processor as claimed in claim 5, wherein the mask bit generator includes:
a comparator to generate first and second comparison signals by comparing a depth value of a current pixel with the off-chip tile maximum value and the off-chip tile minimum value;
a decoder to decode an off-chip mask bit of the current pixel according to the first and second comparison signals; and
a demultiplexer to demultiplex an output of the decoder in response to a selection signal to update a mask-bit of the current pixel as the on-chip mask bit, the selection signal designating the current pixel.

8. The graphic processor as claimed in claim 7, wherein the mask bit generator further includes: a sensor to provide a decision signal indicating a visibility of the current pixel based on the first and second comparison signals.

9. The graphic processor as claimed in claim 1, further comprising: a cache which includes an early depth cache memory to store the maximum depth value, the minimum depth value, and the mask bit.

10. A method of forming graphics data for an image to be displayed, the method comprising:
comparing a depth value of a pixel of a first object with respect to one tile with a tile minimum value and a tile maximum value, the first object being currently rasterized;
determining a visibility of the pixel based on a result of the comparison and a mask bit indicating whether the pixel is drawn or not; and
when a second object with respect to the one tile is rasterized prior to the first object, obtaining the tile minimum value and the tile maximum value from the second object,
wherein comparing the depth value of the pixel includes classifying the pixel in one of a visible region, an uncertain region, or an occluded region based on the depth value of the pixel, the pixel classified in the uncertain region when the depth value of the pixel is between the tile minimum value and the tile maximum value, and
wherein determining the visibility of the pixel includes determining the visibility of the pixel classified in the uncertain region based on a stencil test and a depth test, the pixel classified in the uncertain region determined to be a visible pixel when the pixel passes both the stencil and depth tests, wherein a pixel in the occluded region is determined to be an uncertain pixel when the mask bit has a first value and is determined to be an occluded pixel when the mask bit has a second value.

11. The method as claimed in claim 10, further comprising, when the first object is initially rasterized with respect to the one tile, setting the tile minimum value and the tile maximum value to predetermined values.

12. The method as claimed in claim 10, further comprising:
setting the tile maximum value at the greatest value of depth values of pixels with respect to the second object, and setting the tile minimum value at the smallest value of depth values of pixels with respect to the second object.

13. The method as claimed in claim 10, further comprising determining that the pixel is a visible pixel when the depth value of the pixel is smaller than the minimum tile value.

14. The method as claimed in claim 10, further comprising determining that the pixel is an occluded pixel when the depth value of the pixel is greater than the tile maximum value and the mask bit indicates that the pixel is drawn.

15. The method as claimed in claim 10, further comprising determining that a pixel is in the uncertain region when the depth value of the pixel is greater than the tile maximum value and the mask bit indicates that the pixel is not drawn.

16. The method as claimed in claim 10, further comprising:
updating the tile maximum value whenever depth values of the pixels in the one tile are compared with the tile maximum value, and
updating the tile minimum value after all depth values of pixels in the one tile are compared with the tile minimum value.

17. The method of as claimed of claim 10, further comprising:

generating a modified tile depth value by modifying at least one of the tile maximum value and the tile minimum value based on the comparison of the depth value of the pixel of the second object with the tile maximum value and the tile minimum value; and based on a comparison of the modified tile depth value with a depth value of a pixel of a third object that is to be rendered after rendering the pixel of the second object, determining whether a depth test is to be run on third data corresponding to the pixel of the third object, wherein determining whether the depth test is to be run includes:

determining that the depth test is not to be run when the pixel depth value of the pixel of the second object is less than the tile minimum value, or when a mask bit corresponding to the pixel of the second object is in a first state and the pixel depth value of the pixel of the second object is greater than the tile maximum value; and determining that the depth test is to be run when the mask bit is in a second state and the pixel depth value of the pixel of the second object is greater than the tile maximum value, or when the pixel depth value of the pixel of the second object is greater than the tile minimum value but less than the tile maximum value.

18. A graphic processor, comprising:

a rasterizer configured to process vertex data to generate fragment data based on a maximum depth value, a minimum depth value, and a mask bit of each pixel included in one tile, each mask bit indicating whether each pixel is drawn or not, the vertex data including three dimensional information of the pixels;

a pixel shader configured to process the fragment data to generate color data; and a raster operation unit configured to convert the color data to pixel data to be displayed, wherein, for previous and current objects with respect to the one tile, the current object being currently rasterized, and the previous object being rasterized prior to the current object, a tile minimum value and a tile maximum value for the one tile are obtained from the previous object, wherein the rasterizer is to classify each pixel in one of a visible region, an uncertain region, or an occluded region based on a depth value of said each pixel, the rasterizer to classify a pixel in the uncertain region when the depth value of the pixel is between the tile minimum value and the tile maximum value, and wherein the pixel shader is to determine a visibility of the pixel classified in the uncertain region based on a stencil test and a depth test, the pixel classified in the uncertain region determined to be a visible pixel when the pixel passes both the stencil and depth tests, and wherein:

the tile maximum value is updated whenever each depth value of pixels in one tile is compared with the tile maximum value, and the tile minimum value is updated after all depth values of pixels in the one tile are compared with the tile minimum value, and wherein the rasterizer is to determine a pixel in the occluded region as an uncertain pixel when the mask bit has a first value and is to determine the pixel in the occluded region as an occluded pixel when the mask bit has a second value.

\* \* \* \* \*